United States Patent [19]

Abramson et al.

[11] 4,112,264

[45] Sep. 5, 1978

[54] TESTING AND SWITCHING SYSTEM INCLUDING REMOTELY CONTROLLABLE STATIONS FOR INFORMATION TRANSMISSION AND COMMUNICATIONS NETWORKS AND SYSTEMS

[75] Inventors: Carl N. Abramson, Bridgewater, N.J.; David Kohl, Brooklyn, N.Y.; Thomas Ogen, Corona, N.Y.

[73] Assignee: Bowne Time Sharing, Inc., New York, N.Y.

[21] Appl. No.: 755,010

[22] Filed: Dec. 28, 1976

[51] Int. Cl.² .................................................. H04B 3/46
[52] U.S. Cl. .......................... 179/175.3 R; 324/83 D; 324/103 P
[58] Field of Search .................. 179/175.3 R, 175.2 R; 324/77 R, 83 D, 99 D, 103 P, 57 N

[56] References Cited

U.S. PATENT DOCUMENTS

| | | | |
|---|---|---|---|
| 3,582,780 | 6/1971 | Hole | 324/83 D |
| 3,705,275 | 12/1972 | Leyburn et al. | 179/175.3 R |
| 3,764,903 | 10/1973 | Griswold | 324/83 D |
| 3,822,367 | 7/1974 | Humphrey | 179/175.3 R |
| 3,895,294 | 7/1975 | Vinding | 324/83 D |
| 3,965,418 | 6/1976 | Bauer et al. | 324/99 D |
| 3,973,197 | 8/1976 | Meyer | 324/99 D |
| 3,980,839 | 9/1976 | Hutcheson | 179/175.2 R |
| 4,029,913 | 6/1977 | Gunderson | 179/175.3 R |

OTHER PUBLICATIONS

"Automatic Transmission Measurements on Central Office Trunks" in Automatic Electric Technical Journal by Brown et al., Jan. 1970, pp. 2–12.

The Bell System Tech. Journal, Jul. 1960, pp. 911–925, by Cochran et al., "A New Measuring Set for Message Circuit Noise".

*Primary Examiner*—Douglas W. Olms
*Attorney, Agent, or Firm*—Kenyon & Kenyon, Reilly, Carr & Chapin

[57] ABSTRACT

A testing and switching (tester) system is disclosed for information transmission and communications networks and systems and the like. According to a preferred embodiment, a data transmission network is advantageously of the type in which remotely located users or customers are afforded time-shared access to a centrally located computer. The data transmission network includes remotely located switching stations which are linked to the central computer over data transmission lines which include selectively actuated normal and fallback local loops. The network users gain access to the centrally located computer over selectively actuated local lines to the remotely located switching stations. The tester system comprises switching and testing apparatus which includes a programmable tester computer located at the remotely located stations and preferably at the centrally located computer site also. The tester computer is programmable from the centrally located computer site and is preferably under command control of the centrally located computer site. The tester system tests, including programmed and manual tests, network data transmission parameters at sites having switching and testing apparatus, and also performs programmed and manually controlled switching at those sites. The tester system is especially suited to testing and switching in a telephone data transmission network in which the data transmission lines are typically leased data transmission long lines and in which the selectively actuated local lines to the remotely located stations are part of the telephone company DDD network. Access to the remotely located stations by the centrally located computer site is also gained over selectively actuated lines which advantageously form part of the DDD network. The tester system advantageously tests and measures voice and data transmission parameters including signal level, phase jitter, and noise. Methods and apparatus are also disclosed for performing these tests.

78 Claims, 21 Drawing Figures

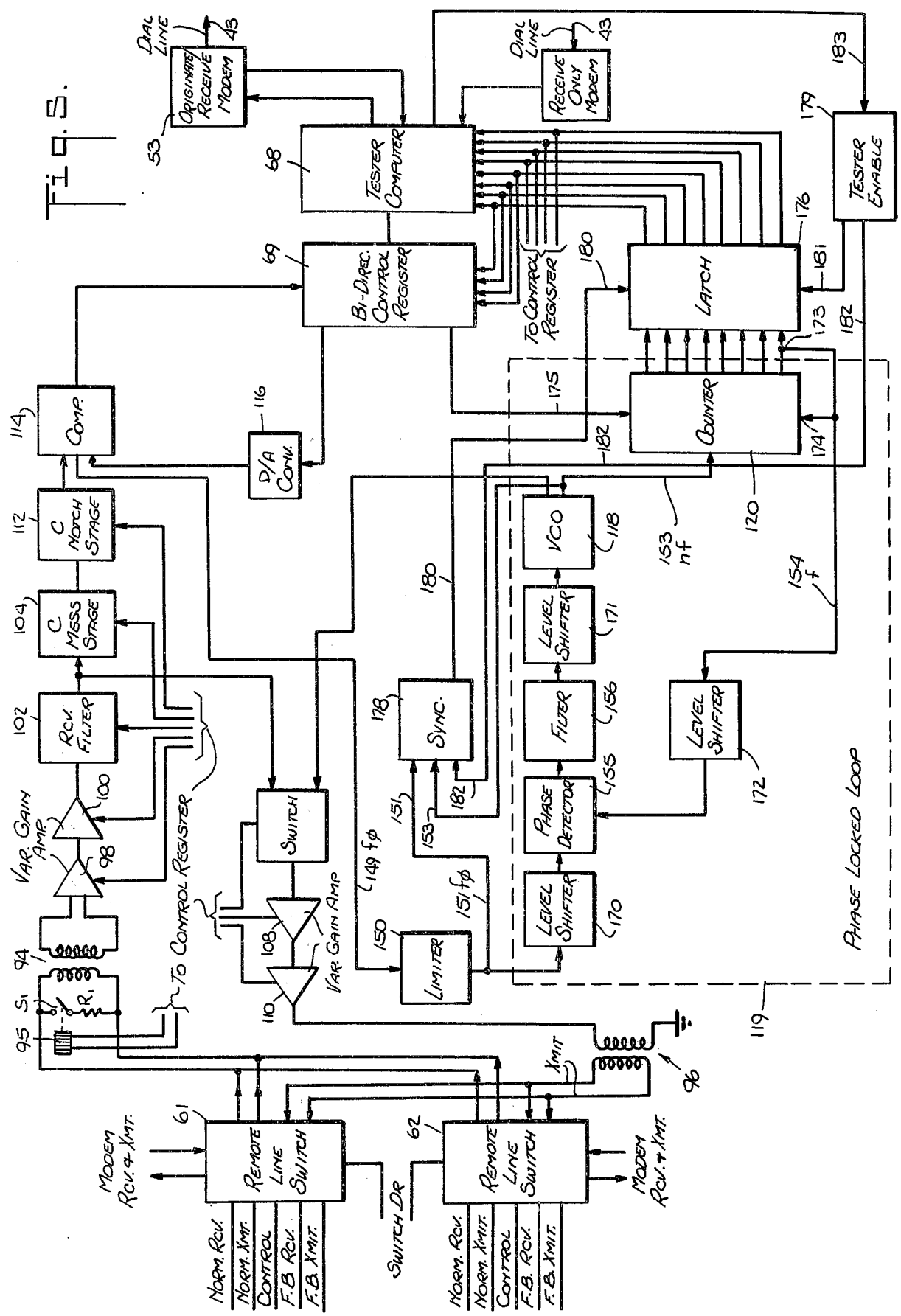

Fig. 11.
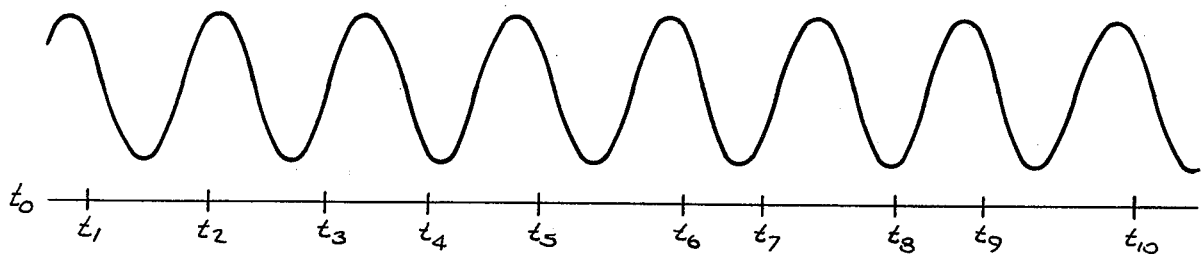
Fig. 11A.
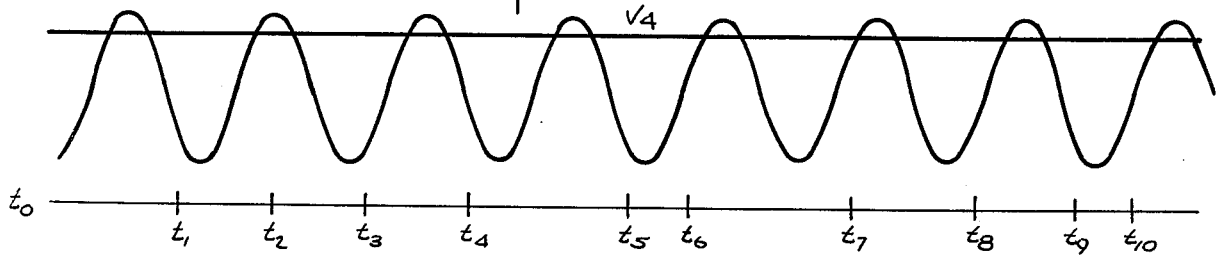
Fig. 11B.
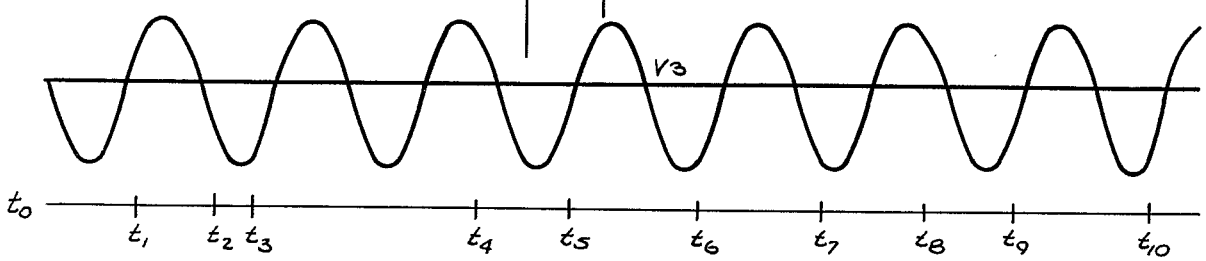
Fig. 11C.
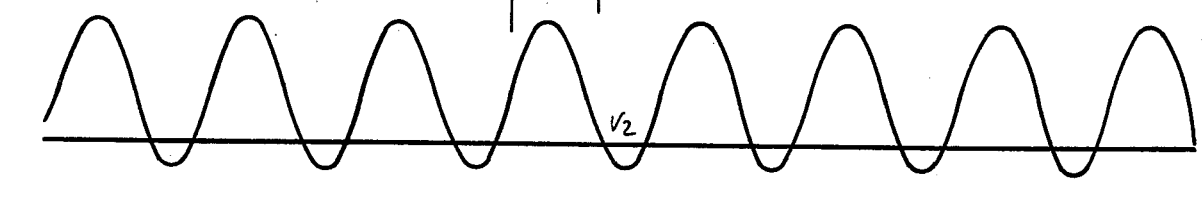
Fig. 11D.
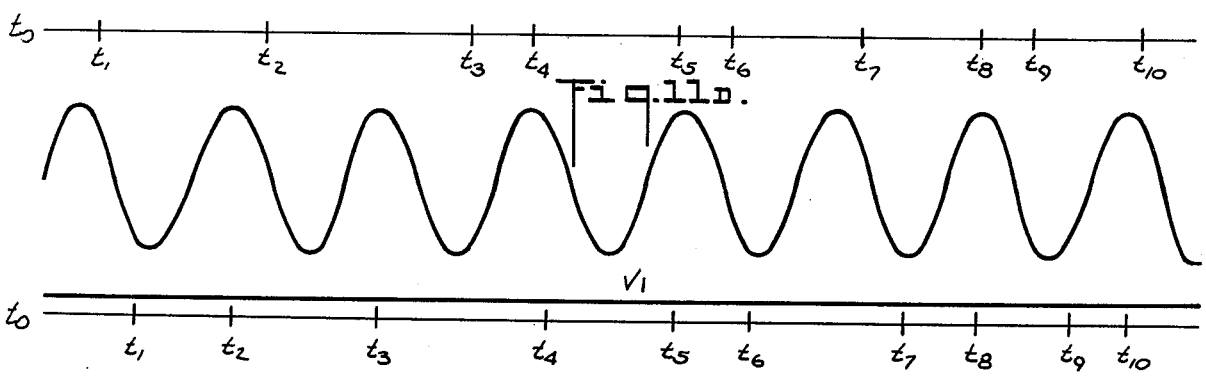
Fig. 11E.

TESTING AND SWITCHING SYSTEM INCLUDING REMOTELY CONTROLLABLE STATIONS FOR INFORMATION TRANSMISSION AND COMMUNICATIONS NETWORKS AND SYSTEMS

BACKGROUND OF THE INVENTION

1. Field of the Invention

The present invention relates to testing and switching systems for information transmission and communications networks and systems, and the like, and more particularly to testing and switching stations therefor which include programmable control and processing circuitry. The present invention also relates to methods and apparatus for measuring network and system parameters including signal level, phase jitter, and noise.

2. Description of the Prior Art

Testing systems for information and communications networks and systems are known as are methods and apparatus for performing certain tests therefor. It is known to place test equipment remotely from a central station and to activate and/or control the test equipment remotely by use of the line normally used for information transmission or communication and by another control line, for example, a commercial telephone line or a DDD line (direct distance dialed network of the Bell system). See, for example, the following U.S. Pat. Nos. 3,431,369; 3,822,367; 3,859,468; 3,860,769; 3,864,533; 3,457,373; 3,814,840; 3,943,305; 3,922,508; 3,912,882; 3,407,877; 3,819,878; 3,743,938.

However, prior art testing systems are lacking with respect to the capability of remote equipment to operate in essentially or substantially independent modes and perform many functions related to these modes. For example, prior art remote test equipment is unable to originate a test communication between the remote equipment and other remote test equipment or the central station or even the same remote test equipment, and they are additionally unable to do so over lines or links that are not normally used for information transmission or communication. For example, U.S. Pat. Nos. 3,822,367 and 3,431,369 both disclose the capability in a test system for a central station in a telephone network to communicate with a remote testing station by commercial dial lines or DDD lines which are not normally used for information transmission or communication wherein the central station originates and controls the communication. An undated publication and a publication dated January, 1976 of ADC Telecommunications division of Magnetic Controls Company also indicate the existence of this capability. Prior art test systems include remote test equipment slaved to the central station which central station usually includes processing and control means for the test system. Accordingly, known remote test equipment is unable to perform many functions as mentioned hereinbefore, one of them being to originate a communication as described hereinbefore. While it is known in the prior art, for example as disclosed in U.S. Pat. 3,431,369, for remote test equipment to cooperate in the performance of system tests and also for the remote test equipment to participate in testing by generating test signals and receiving test signals generated from the central station, such cooperation, generating of test signals and receiving of test signals is completely under the control of the central station which performs the processing. For example, it is well known to control switching at remote locations from a central station to provide a loop-back in which a pair of information transmission or communication lines are interconnected at the remote location. It is also known to do this by interconnecting at the remote location a line normally used for information transmission or communication and a control line, for example, a commercial dial line or DDD line. Additionally, processing and interpretation of the test results is accomplished at the central station, the remote equipment merely relaying information to the central station. Thus, known remote test equipment is unable to perform tests under its own control, i.e., for example, under the control of a program located in the remote equipment and also unable to process and interpret the results of any such testing. Moreover, known remote test equipment is unable to generate, adjust, change, etc., test signals under its own control in accordance with the test at hand and the system parameters in effect. Known remote test equipment is also unable to perform testing between remote locations under control of the remote test equipment. While U.S. Pat. 3,431,369 discloses that far-end unmanned remote test equipment may be controlled through intermediate, unmanned, remote test equipment, both the intermediate and far-end equipment are slaved to the central station and not capable of the independent modes described hereinbefore. It is further not known in the prior art to perform many intensive system tests and to process and interpret the tests results at a remote location during normal information exchange or communication operation of the information transmission and communication network or system. Such intensive tests have heretobefore been performed while the information transmission or communication lines were seized and under control of the testing system.

With respect to the performance of specific tests by the known testing systems, particularly phase jitter tests, signal level and related tests, and noise tests, as mentioned hereinbefore such tests are completely under the control of the central station which also processes and interprets the results. Methods and apparatus for performing these tests are known in the art. A description of particular transmission parameter tests and test specifications applicable to the Bell telephone system is given in AT&T Technical Reference PUB41008 "Transmission Parameters Affecting Voiceband Data Transmission - Description of Parameters" (July, 1974) and in AT&T Technical Reference PUB41009 "Transmission Parameters Affecting Voiceband Data Transmission - Measuring Techniques" (May, 1975). See also U.S. Pat. No. 3,814,868.

With respect to phase jitter, known methods and apparatus for performing phase jitter tests measure the phase angle between a phase-stable test signal and a signal having phase jitter and provide an analog output proportional to the phase difference between the two signals. One such method converts the signals to square waves and provides an analog output proportional in magnitude to the coincidence of the square waves, a zero phase difference between the square waves providing a zero output. Another method employs a variable delay line. Still another method uses a phase-locked loop detector in which the phase detector output has a DC component that is proportional to the phase difference between the signal to be tested and a phase-stable, voltage-controlled oscillator (VCO) signal. These delay line and phase-locked loop techniques have the disadvantage that they are bandwidth-limited and all of the aforementioned techniques require analog-to-digital conversion for use in a digital system. See also U.S. Pat. No. 3,777,256 relating to measurement of frequency delay distortion.

With respect to voltage and current signal level measurements, known techniques in which a digital equivalent of the voltage or current is obtained merely perform an analog-to-digital conversion. The disadvantages associated with such techniques relate to the bandwidth and speed capability of the particular analog-to-digital converter. This is true regardless of whether an instantaneous measurement is performed or whether peak or average measurement are performed. Additionally, the analog-to-digital converter is usually somewhat dependent upon the wave shape of the signal to be measured.

There are several known methods for measuring average power, one well known method being the integration of electrical energy converted to heat energy by a heat sensitive device. A bolometer may be used for this and integrates the energy and provides a DC output proportional to the average power. This method is especially useful at microwave frequencies where discrete measurements are not practical or are impossible. Other power meters average the signal; they are correlated to a particular wave shape and they make approximations with respect to the particular wave shape. Still other power meters use a DC multiplier which multiplies the input signal by itself to give the squared function, and then a capacitor is used at the output, for example, to integrate the power. Usually a long time constant is used to measure the power over, for example, a second. This last type of system makes a "true" power measurement. The major problem in this last type of system, however, is the bandwidth, since an amplifier is used which must be accurate over the bandwidth of the signals being measured in order for a true square to be taken. Additionally, all these methods of measuring power yield a DC value which must be converted from analog to digital for use in a digital processor. One digital technique utilizes an analog-to-digital converter which takes the instantaneous analog value of the input wave, converts it to digital, records the digitized values and then digitally processes the values to determine what the power is. In order to do this, the signal has to be sampled at, for example, 20,000 times in a second and the signal reconstructed according to Nyquist criteria. The 20,000 samples would be the discrete instantaneous amplitude of the wave. These techniques also have the bandwidth disadvantage in that the signal must be within the bandwidth capability of the analog-to-digital converter.

The present invention overcomes these drawbacks and disadvantages of the prior art and realizes additional advantages.

SUMMARY OF THE INVENTION

In accordance with the present invention, a testing and switching system is disclosed for data or information transmission and communications networks and systems in which test stations located remotely from a central station operate in essentially or substantially independent modes, i.e., under their own control, performing tests and measurements under the control of self-contained control means and preferably including processing means to process the results of the tests and measurements made. Preferably, the remotely located test staions are under at least command control of the central station. Preferably, the remote test stations comprise means for originating tests to be completed at the central station or at other remote test stations including means for generating test signals independent of information from the central station preferably upon command from the central station. According to the invention, the remote test stations are operative to receive communications for control and/or test information transfer and to originate communications for control and/or test information transfer over selectively actuated lines and to receive and originate the communications simultaneously. Thus, the remote test stations are operative to originate and receive control communications to participate in the testing of the remote station itself, of the central station, of other remote stations, and of user terminals, preferably over lines not normally or primarily used for system or network information transmission or communication. Accordingly, in a telephone system the remote station is operative to enter into test modes in which it originates and/or receives communications over commercial or DDD lines and, for example, it calls itself on local telephone lines and performs testing rather than the central station testing the remote station over long-distance telephone lines. Preferably, the remote test stations according to the invention comprise computer programs and preferably the programs are remotely loaded into the remote stations from the central station or from other remote equipment, preferably over commercial lines or DDD lines not normally used for system or network information transmission or communication. The remote test stations according to the invention are also operative to perform certain testing and relaying of test information to the central station or other remote locations while information is normally being transmitted through the particular station or while it is in a system communications mode. The remote stations according to the invention are further operative to perform switching at the remote stations independent of the central station.

The remote stations are further operative according to the invention to provide an information transmission or communication link serially from the central station to a far-end remote station through an intermediate remote station wherein the far-end and intermediate remote stations are operative to test, switch and make measurements of lines and parameters therebetween preferably upon command of the central station. Advantageously, the central station orignates a call over a DDD line to the intermediate station which in turn originates a call to the far-end station over another DDD line, whereby testing between the remote stations and/or the central station may be carried out.

Further in accordance with the invention, a test station similar to the remote test stations may be provided at the central station under at least command control of the central station.

Still further in accordance with the present invention, methods and apparatus are disclosed for performing the following tests and measurements: phase jitter; peak and average magnitude, average power, and noise. These tests may be made by remote and local test stations and by cooperation between individual remote stations and between remote stations and the central station. According to a preferred embodiment of the present invention, methods and apparatus are also disclosed for performing the tests and measurements mentioned hereinbefore in telephone data transmission networks and also for performing impulse noise, C-message noise, C-notch noise, amplitude hits and amplitude dropouts tests and measurements.

In accordance with the present invention, phase jitter (unwanted phase modulation) of a signal to be tested is measured by generating a first phase stable signal at a multiple of the frequency of the signal to be tested and a second phase stable signal at the same frequency as the signal to be tested such that selected zero crossings of the second signal and the signal to be tested are in phase, and counting the number of cycles of the first signal generated between the selected, in-phase zero crossings and the next zero crossing of the signal to be tested, whereby the difference in successive counts of the number of cycles is a measure of phase jitter. According to a preferred embodiment, the signal to be tested is a sinusoidal signal of frequency $f$ which is converted into a first square wave at frequency $f$. A phase-locked loop is used to generate a phase stable first square wave or clock signal at frequency $nf$ and a phase stable second square wave at frequency $f$ in which the positive-going edges of the second square wave are in phase with the positive-going edges of the first square wave. The clock pulses are counted between the occurrence of in-phase postive-going edges of the first and second square waves and each next occurring negative-going edge of the first square wave. The change in successive counts is a measure of phase jitter. If there is no change in successive counts, there is no phase jitter. The individual counts and the difference in counts are advantageously in digital form as is therefore the measure of phase jitter. For example, if $n$ is advantageously chosen to be 180, then 180 clock pulses are generated for each cycle of the first square wave and typically 90 should be counted between the positive-going edge of the squarewaves and the negative-going edge of the first square wave which corresponds typically to a half-cycle of the square waves. If phase jitter is present in the first square wave, the number of clock pulses counted will vary, and the number counted can theoretically be from 1 to 180 corresponding to 1° to 360° of phase jitter. Thus, changes in successive counts will be a measure of phase jitter directly in degrees, each count representing two degrees of phase jitter. However, $n$ need not be 180 and may be, for example, 360. Thus one degree resolution is possible and phase jitter in degrees is the difference in successive counts.

In accordance with the invention, the peak value or magnitude of a signal is determined by: (a) sequentially establishing a plurality of reference magnitudes, a respective reference magnitude being established for at least that part of the signal cycle during which the signal is at its peak magnitude; (b) comparing the peak signal magnitude and each sequentially established reference magnitude to obtain respective coded levels, preferably binary, corresponding to each comparison; (c) varying a next respective reference magnitude; and (d) forming a coded notation from the binary levels which approximates the peak signal magnitude. In a preferred embodiment, the geatest reference magnitude is established and compared first and successively decreasing reference magnitudes are sequentially compared thereafter. Alternatively, successive comparisons may be by the method of successive approximations, i.e., by decreasing (or increasing) successive reference magnitudes depending upon the comparison result by the previous reference magnitude by fractions of previous reference magnitudes and differences therebetween. The coded notation is preferably binary in which the binary comparison levels are processed to form a binary coded number which approximates the peak signal magnitude. It is preferred that individual peak signal magnitudes are determined $N_p$ times and that the peak signal magnitude is designated as that magnitude obtained in a majority of the $N_p$ consecutive determinations.

Further in accordance with the invention, the average value or magnitude is determined by: (a) establishing a plurality of pairs of reference magnitudes, each reference magnitude being maintained for the specified time period corresponding to the average measurement and each pair defining a reference magnitude level; (b) comparing the signal magnitude with at least each pair of reference magntidues at a plurality of instances during the specified time period to determine weighted contributions of each reference magnitude level to the average value; and (c) summing each weighted contribution. Each weighted contribution is determined by the product of each reference magnitude level and the weighting ratio P (which approximates probability) corresponding to the respective reference magnitude level. The weighting ratio P is the number of instances, with respect to the total number of instances, N, that the signal magnitude falls within the respective reference magnitude level, i.e., within the pair of reference magnitudes or on one of the reference magnitudes of the pair of reference magnitudes of a respective reference magnitude level. The value assigned to each reference magnitude level is an interpolated reference magnitude having a value between each of the reference magnitudes constituting the pair. Preferably, this interpolated value is midway between the individual reference values of the pair, $S_1$, $S_{n-1}$, and is determind by summing the individual reference values of the pair and dividing by two:

$$\frac{S_n + S_{n-1}}{2}.$$

The signal average value, $S_{av}$, is then $$S_{av} = \sum_{n=1}^{N} \Delta P \frac{(S_n + S_{n-1})}{2};$$

where $\Delta$ P is the respective weighting ratio, i.e., the ratio of the number of instances the signal magnitude falls within the respective reference magnitude level divided by the total number of instances (N) the signal level is compared to the reference magnitude level. It will be observed that the signal need not be periodic to determine its average value where the reference magnitude pairs are established simultaneously for the specified time.

As mentioned hereinbefore, the signal is compared with each reference magnitude level and each reference level magnitude is weighted by a weighting or probability ratio $\Delta$ P to determine the contribution of the particular reference magnitude level. The reference magnitude levels may be established simultaneously and compared with the signal simultaneously, or each reference level may be established and compared with the signal sequentially. Further, each of the reference magnitudes of a respective pair can be established simultaneously or sequentially, and compared with the signal simultaneously or sequentially. In all cases, where the signal is compared to each individual reference magnitude, the weighting ratio P is determined by taking the difference (absolute) of the weighting ratios $P_n$, $P_{n-1}$, for each reference level, $S_n$, $S_{n-1}$. The weighting ratios $P_n$, $P_{n-1}$ for each reference magnitude $S_n$, $S_{n-1}$ are determined by dividing the number of times the signal exceeds the respective reference magnitude by the total number of times the respective reference magnitude and the signal are compared. The interpolated reference level remains $$\frac{(S_n + S_{n-1})}{2},$$

and the average signal magnitude is approximated by:

$$S_{av} = \sum_{n=1}^{N} (|P_n - P_{n-1}|) \frac{(S_n + S_{n-1})}{2}.$$

Average power is determined in accordance with the invention by summing the square of the weighted contributions of the absolute magnitude of the reference magnitudes determined according to the invention as follows:

$$P_{av} = K \sum_{n=1}^{N} (|P_n - P_{n-1}|) \frac{(S_n + S_{n-1})^2}{2};$$

where K is the system proportionally constant and includes the resistance R of well known formulae as well as other system parameters.

In accordance with the invention, if the signal is compared an arbitrary predetermined number of times, for example, preferably more than 100 times ($N > 100$), then it will be observed that the determination of average signal magnitude and power tends to be statistical; i.e., over a given period of time corresponding to N comparisons, the number of times the signal falls within the respective reference magnitude level will tend to be statistical and the contribution of that reference magnitude level to the average will also tend to be statistical. Increasing N to a very large number, for example 20,000, which extends the measurement time, will make the average measurement essentially a statistical one. However, N may be as low as about 10. Further in accordance with the invention, the comparisons are preferably made asynchronously with respect to the signal and also aperiodically.

Still further in accordance with the invention, the noise, amplitude hits and amplitude drop-outs measurements are made in accordance with the invention by utilizing according to the invention the methods and apparatus for making peak and average measurements.

The drawbacks associated with the prior art measurements are obviated by the present invention which is essentially independent of signal speed, frequency, timing and wave shape and hence not bandwidth limited, and provides a digital output. Additionally, the signal to be measured may be randomly compared to reference magnitudes in accordance with the peak and average signal level measurements of the invention. Accordingly, the wave shape of the signal to be measured may be sinusoidal, square, triangular, exponential, etc. Moreover, the accuracy of the measurements is typically increased by increasing digital time resolution for phase jitter and by increasing the number of comparison times and the number of references, and extending the measurement time for peak and average signal level.

These and other aspects of the present invention will be more apparent from the following description of the preferred embodiments thereof when considered with the accompanying drawings.

BRIEF DESCRIPTION OF THE DRAWINGS

The present invention is illustrated by way of example and not limitation in the figures of the accompanying drawings in which like numerals refer to like parts and in which:

FIG. 5 is a detailed block diagram of the remote tester/switcher of FIG. 3 including circuit block diagrams showing preferred embodiments of apparatus for making measurements of network parameters and for illustrating methods for making said measurements;

FIGS. 11A-11E are plots of several cycles of a signal illustrating a preferred embodiment of measuring according to the invention the average magnitude of the signal;

DESCRIPTION OF THE PREFERRED EMBODIMENTS

While the invention disclosed and claimed herein will be further described in a preferred embodiment which includes a data transmission network having a time-shared computer, it is to be understood that it is not intended to so limit the present invention thereto. The present invention may also be embodied in information exchange systems and networks, time-shared communications systems and systems and networks not being time-shared and not including a computer. Similarly, it is not intended to limit the invention to telephone commmunication and data transmission networks and systems.

Figure 1:
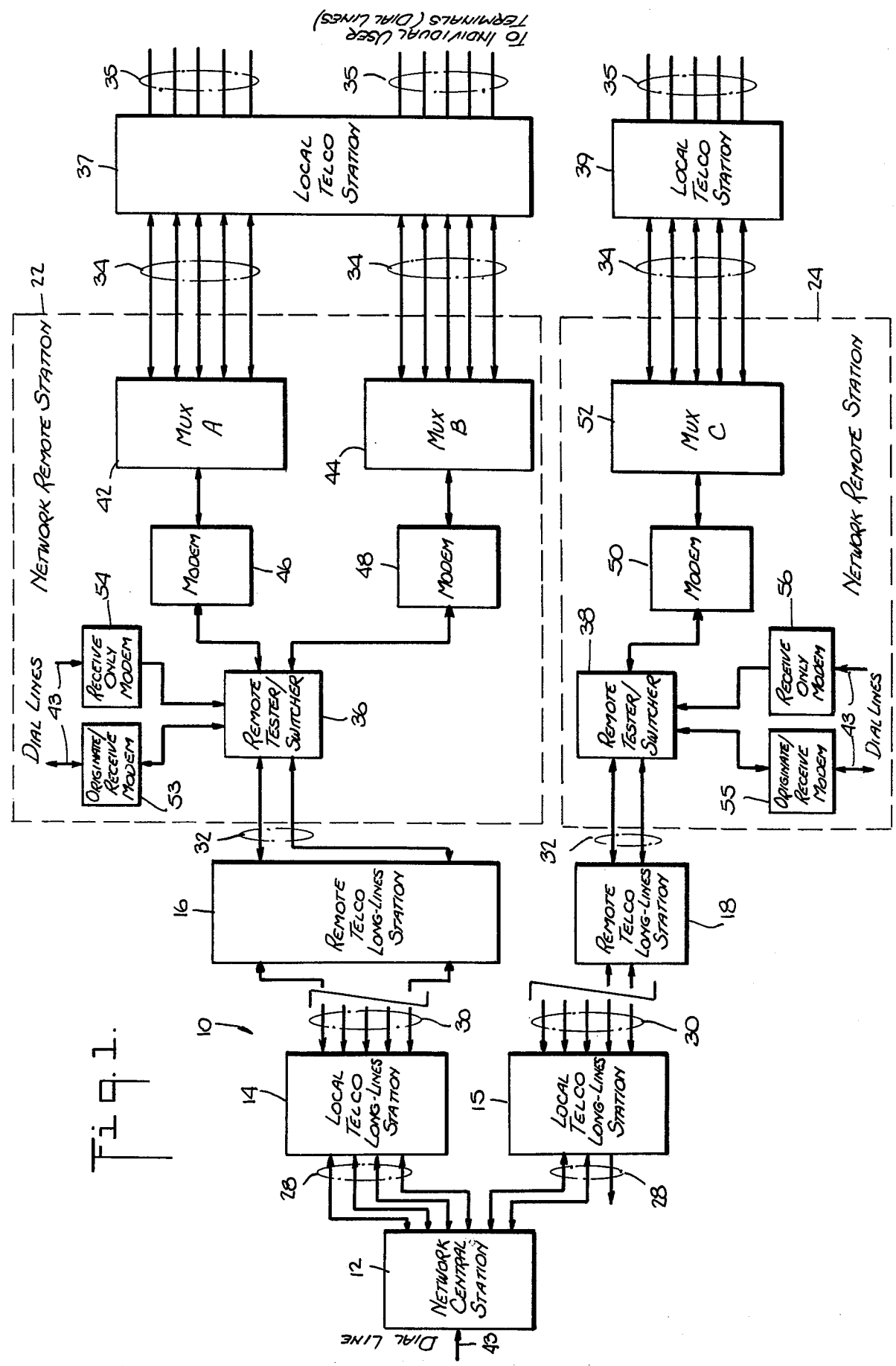
FIG. 1 is a block diagram of a telephone data transmission network and testing and switching system according to a preferred embodiment of the invention.

In accordance with the preferred embodiment, FIG. 1 shows a block diagram of telephone data transmission network 10 including the network central station 12, the local (to the network central station) telephone company long-lines stations 14, 15, remote telephone company long-lines stations 16 and 18, and network remote stations 22 and 24. The network central station 12 includes a central time-shared computer (not shown in FIG. 1) which is connected to remote users or customers through telephone lines 28, 30, 32, 34 and 35 and the telephone and network stations. Telephone lines 28, 30, 32 and 34 are leased lines, lines 28, 30 and 32 being high-speed data transmission lines, lines 30 being long-lines, and telephone lines 35 are dial lines.

Telephone long-lines stations 14, 15 have been shown to be directly linked to the network central station 12 by lines 28. Usually, however, local telephone switching stations (not shown) are located between the network central station 12 and the local telephone long-lines stations 14, 15 on some or all of lines 28. The leased lines 28 would then run between the network central station 12 and the local telephone switching stations (not shown) and other lines (not shown) in the telephone company network would run between the local telephone long-lines stations 14, 15 and the local telephone switching stations. Similarly, at the remote locations, local telephone switching stations (not shown) will be located between the remote telephone long-lines stations 16, 18 and the network remote stations 22, 24. Lines (32) running to the local telephone switching stations (not shown) would be leased. Each user is provided with a terminal (not shown) and, as local telephone switching stations (not shown) are located between the network central station and the local telephone long-lines stations 14, 15 and between the remote telephone long-lines stations 16, 18 and the network remote stations 22, 24, local telephone switching stations 37, 39 are also located between the network remote stations 22, 24 and the user terminals. The connections made at the telephone company stations between telephone lines used in the network may be switched or hard-wired. Each network remote station is provided with multiplexing and modulation and demodulation (modem) means while the network central station 12 is also provided with modem and multiplexing means. Accordingly, a plurality of users may be switched through a network remote station to the central computer and a plurality of network remote stations may be switched at the network central station 12. A remote tester/switcher 36, 38 is provided at selected network remote stations and a local tester/switcher (not shown in FIG. 1) is preferably provided at the network central station 12. The tester/switchers test selected data transmission parameters and provide switching from the network remote station and the network central station to the respective telephone company long-lines and switching stations. The remote tester/switchers 36, 38 are programmable over one of dial lines 43 from the network central station 12 by way of receive only modems 54, 56. According to preferred embodiments, the remote tester/switchers 36, 38 are at least command controllable from the network central station 12.

Referring specifically to network remote station 22, time-sharing switching is accomplished by multiplexers 42 and 44 and modulation and demodulation between the user terminals and the network central station by modems 46 and 48. Data to and from the users served by network remote station 22 is routed from the local telephone station 37 through tester/switcher 36 by multiplexers 42, 44 and modems 46, 48. Similarly, the users served by network remote station 24 are connected to the network central station 12 by local telephone station 39, network remote station 24, remote telephone long-lines station 18 and local telephone long-lines station 15; and network remote station 24 similarly comprises a remote tester/switcher 38, a modem 50 and a multiplexer 52. Accordingly, data transmission parameters locally and at the network remote stations may be tested and measured with respect to transmission over lines 28, 30, 32, 34 and 35 (including respective modems, multiplexers and switches); testing and switching tests may be conducted with respect to lines 28, 30, 32 and 34; and loop-back tests may be conducted with respect to lines 28, 30 and 32.

The tester system is operative to perform measurements and testing at the network central and remote stations including but not limited to the following: signal level including signal power level; background noise including C-message and C-notch; impulse noise; phase jitter; and amplitude hits and drop-outs. These transmission parameters are well known in the art.

Access to the remote stations via dial lines 43 is made through modems 53, 54, 55, 56 typically of the low speed asychronous type. The modems 53–56 are operative to link the remote tester/switchers 36, 38, respectvely, to the originator of a dial procedure. By dial procedure it is meant any telephone communication between an originator and a receptor in which the normal telephone company dial lines are employed and in which the telephone company network must be dialed into. The originator may carry out the procedure using peripheral equipment such as a teletype terminal, low speed modem, recording equipment coupled into the telephone company network by audio or electrical means, etc. For example, the network central station 12, the dial procedure originator, "dials" the remote tester/switcher 36 and is linked thereto via dial line 43 by modem 54. The dial line 43 may pass through one or more telephone company stations (not shown). In other words tester/switcher 36 through modem 54 answers a dialed "call" originated by the network central station 12. However, tester/switchers 36, 38 through respective modems are not restricted to receiving dial procedures from the network central station 12 but are also operative to receive dial procedures originated by originators other than the network central station 12.

Tester/switchers 36, 38 through modems 53, 55 are also preferably further operative to originate a dial procedure and "call" different telephone numbers such as that of its own remote station over lines 34 or that of another remote station. Also, a single tester through its two low speed modems may simultaneously originate and receive dial procedures wherein one of the modems (53, 55) is an originator and the other (54, 56) is a receptor. To ensure this simultaneous capability, one low speed modem (53, 55) is an originate/receive modem through which the tester/switcher originates and receives dial procedures and the other is a receive only modem (54, 56) through which the tester/switcher can only receive a dial procedure. In FIG. 1, modems 53 and 55 are originate/receive modems and 54 and 56 are receive only modems.

As will be described more fully hereinafter, a tester/switcher, through an originate/receive modem (53, 55), will typically originate a dial procedure upon command from the network central station, or from a program contained in the respective remote tester/switcher upon command from the network central station. For example, if it is desired to test the network remote station multiplexer 42 and/or modem 46 to determine accessibilty to the data network by users via local lines 34, tester/switcher 36 through modem 53 initiates a dial procedure to multiplexer 42 via dial line 43, local telephone station 37, and local lines 34. In this way, the local lines 34 from the local telephone station 37 to the multiplexer 42, as well the multiplexer 42 and modem 46, may be tested completely remotely and by the use of local (as opposed to long-distance) telephone lines. This may be done for each of the local lines 34 individually. Also, where the local lines 34 are arranged in a rotary system, these may be tested sequentially as well as individually.

The remote tester/switcher is also preferably provided with a programmed computer to accomplish testing of all lines 34 on a single "call" from the tester/switcher and with means to identify the particular line being tested in a rotary system on a sequential test. As mentioned hereinbefore, receive only modems 54, 56 may receive dial procedures originated by originators other than the network central station 12. Specifically, one modem, for example modem 54, may receive a dial procedure originated through modem 55. As also mentioned hereinbefore, two low speed modems, for example modems 53 and 54, may simultaneously be used through which separate dial procedures are originated and received. For example, the network central station may originate a dial procedure to receive only modem 54 thereby gaining access to tester/switcher 36 and cause tester/switcher 36 through originate/receive modem 53 to call, for example, another tester/switcher, or call tester/switcher 36 through modem 46, multiplexer 43, local telephone station 37 and local lines 34 while the network central station is still connected to tester/switcher 36 through modem 54. This aspect of the invention will be described more fully hereinafter. Also, a user may test his terminal and line 35 to the telephone company local switching station, for example station 37, by originating a dial procedure to the tester/switcher 36 through modem 54. In this way, a user could indirectly test his lines to the network remote station without having any testing equipment situated at his terminal.

A preferred embodiment of the invention is shown in FIG. 1. Network remote stations 22, 24, which typically may be located in widely separated cities, are connected to the network central station 12 by separate leased long lines 30. According to an alternate embodiment shown in FIG. 2, a single leased long line 30 is used to connect the network central station 12 to two network remote stations 24, 57. This alternate embodiment is particularly advantageous where the network remote stations 24, 57 are both widely separated from the network central station 12 while being relatively close together. For example, the network central station may be located in New York while the remote stations 24, 57 are located in Los Angeles and San Francisco. This embodiment may also be advantageous where the remote stations 24, 57 form a geographic serial path to the network central station, as for example, a New York (network central station), Kansas City, Los Angeles arrangement. Briefly, this is accomplished by connecting network remote station 24 over line 31 to network remote station 57 which in turn is connected to the network central station 12 over leased long-line 30. More particularly, network remote station 24 is shown identically as in FIG. 1 and is connected to remote telephone company long-lines station 18 over lines 32. Line 31, typically a long-line, runs between remote telephone long-lines stations 16, 18 and is used to connect network remote station 24 and the users connected thereto to the network central station over leased long-line 30 through, however, network remote station 57. One of the local telephone lines 32 connects line 31 to network remote station 57 through telephone station 16. Network remote station 57 is similar to network remote station 22 of FIG. 1 except that only one high speed modem 48 and one multiplexer 44 are used between local telephone station 37 and tester/switcher 36 and an additional high speed modem 58 is used to connect station 24 to multiplexer 44 as an additional high speed input 59. Lines 32A connect line 31 (through telephone station 16) to tester/switcher 36 and line 32B connects tester/switcher 36 (and lines 32A) to modem 58. Multiplexer 44 multiplexes line 59 into modem 48 for connection to the network central station as described hereinbefore for users connected through local telephone station 37. The embodiment shown in FIG. 2 and described hereinabove permits the leasing of a single long-line (30) to one network remote station (57) (an intermediate network station 57) and then branching out to other network remote stations (24) (far-end network remote stations 24) which are closer to the intermediate station than to the network central station (12) or form a serial path with the intermediate network station 57 to the network central station 12.

Figure 2:
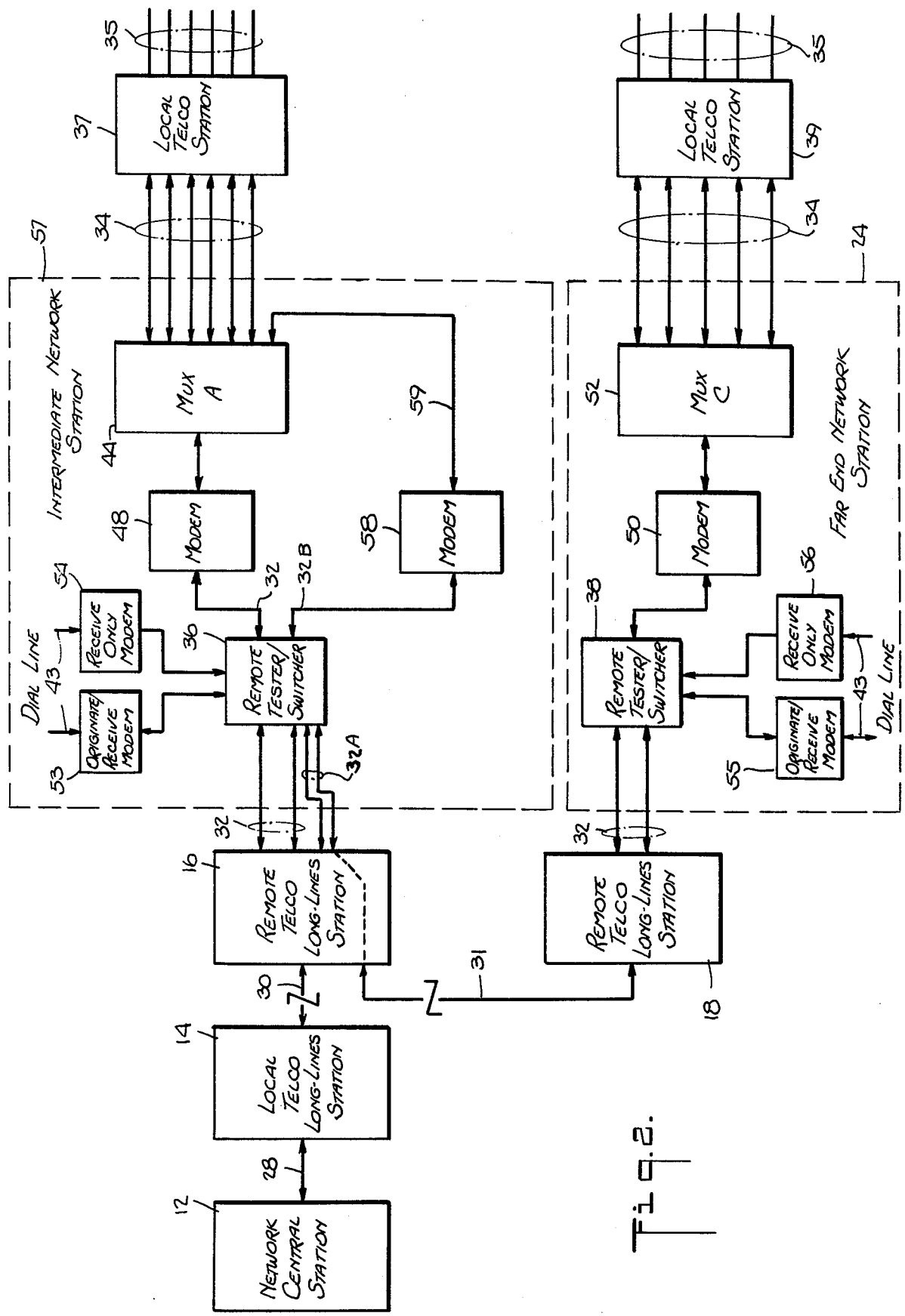
FIG. 2 is a block diagram of a telephone data transmission network and testing and switching system according to another embodiment of the invention.

Testing in the mode shown in FIG. 2 proceeds in the same manner as in FIG. 1, i.e., the network central station 12 can control both network remote stations in parallel over separate dial lines through the respective receive only modems, or the network central station may use the receive only modem of one remote station to control it and through that station's originate-receive modem control another network remote station through the other station's receive only modem. For example, network central station 12 could control intermediate station 57 through modem 54 and serially control station 24 through modem 53 of station 57 and modem 56 of station 24. Thus, network central station 12 need make only one call to control both remote stations.

Figure 3:
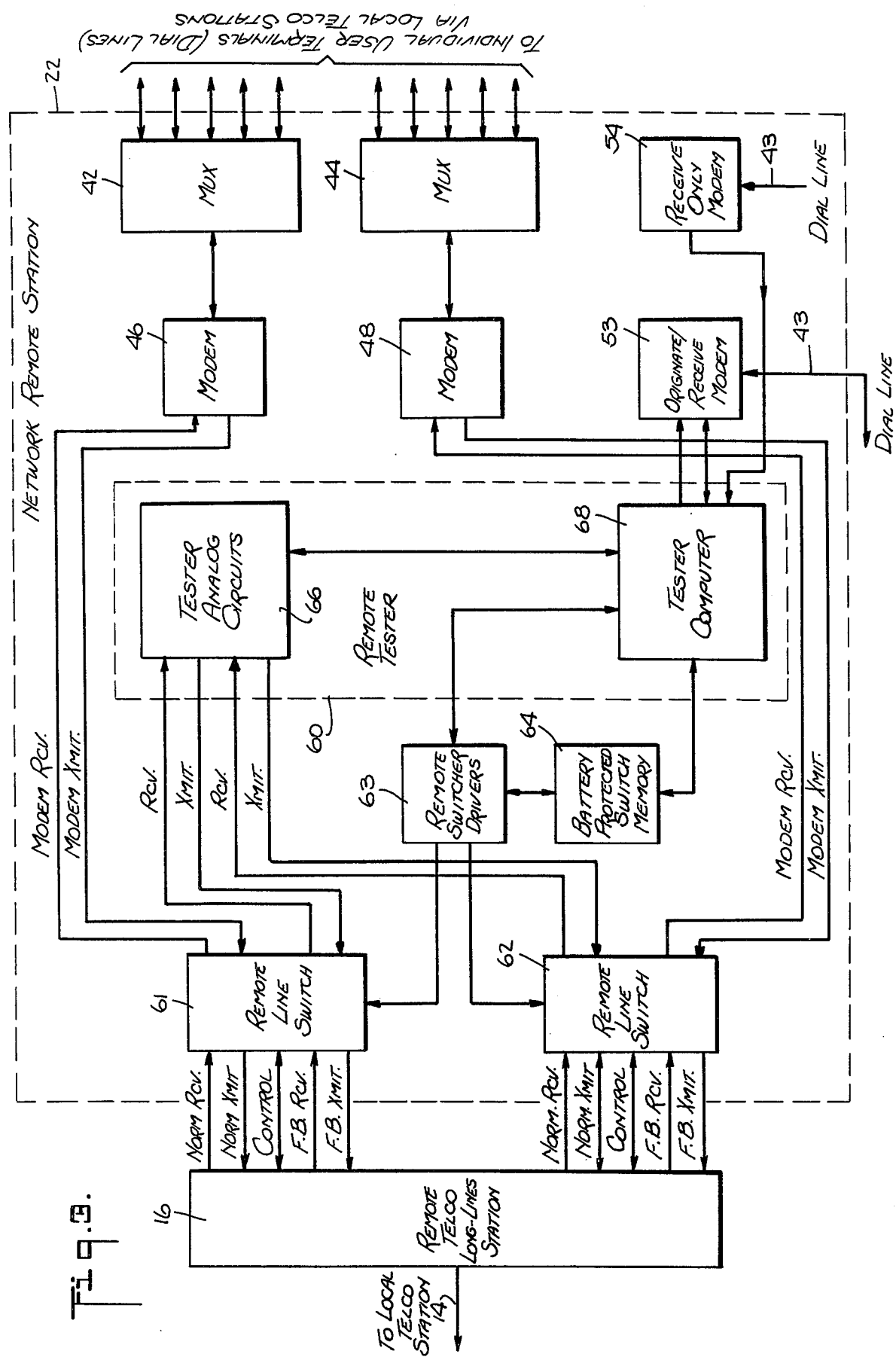
FIG. 3 is a block diagram of parts of the network of FIG. 1 and showing in greater detail a network remote station and a remote tester/switcher according to the invention.

Referring now to FIG. 3, a block diagram of network remote station 22 is shown which includes remote tester 60, remote line switches 61, 62, remote switch drivers 63, battery protected switch memory 64 and modems 53, 54. Network remote station 24 is not shown or described in detail since it includes a remote tester and related switching and is similar to network remote station 22 except that it comprises a single modem 50 and remote multiplexer 52. The remote tester 60 includes an analog part 66 and a digital tester computer 68. Tester computer 68 includes memory means, bidirectional control register means and processing means and is remotely programmable from the network central station through dial line 43 and modem 54. The tester computer 68 controls and receives data from the analog circuits 66 and controls the switching of and receives signals from the network remote station line switches 61, 62. The analog circuits 66 are connected to the line switches 61, 62 while the modems 46, 48 are also connected to the line switches by respective receive and transmit lines. The remote telephone company long-line station is connected to the remote line switches 61, 62 of the network remote station 22 by normal and fallback receive and transmit lines as well as by a control line. Normal and fallback lines are provided in the event of failure or reduced performance in one or the other. The control lines are used to accomplish switching at the telephone company station between normal and fallback lines. As controlled by the tester computer 68, the normal or fallback receive and transmit lines are connected to the modems 46, 48 for normal data transmission over the modem receive and transmit lines. The tester analog circuits 66 may also be connected to either the normal or fallback receive or transmit lines for testing during normal data transmission. Additionally, the modem receive and/or transmit lines to modems 46 and 48 may be disconnected as controlled by the tester computer 68 for testing purposes including loop-back tests to the network central station over an inter-connected receive and transmit line pair such as the normal receive and transmit lines. Both the network central station and the network remote station 22 comprise means for generating test signals. Use of these test signals enables the network to be tested both at the network central station and at network remote stations over the lines connecting them and such testing is both controllable from the network central station and independently controllable at the remote station preferably upon command from the network central station.

Figure 4:
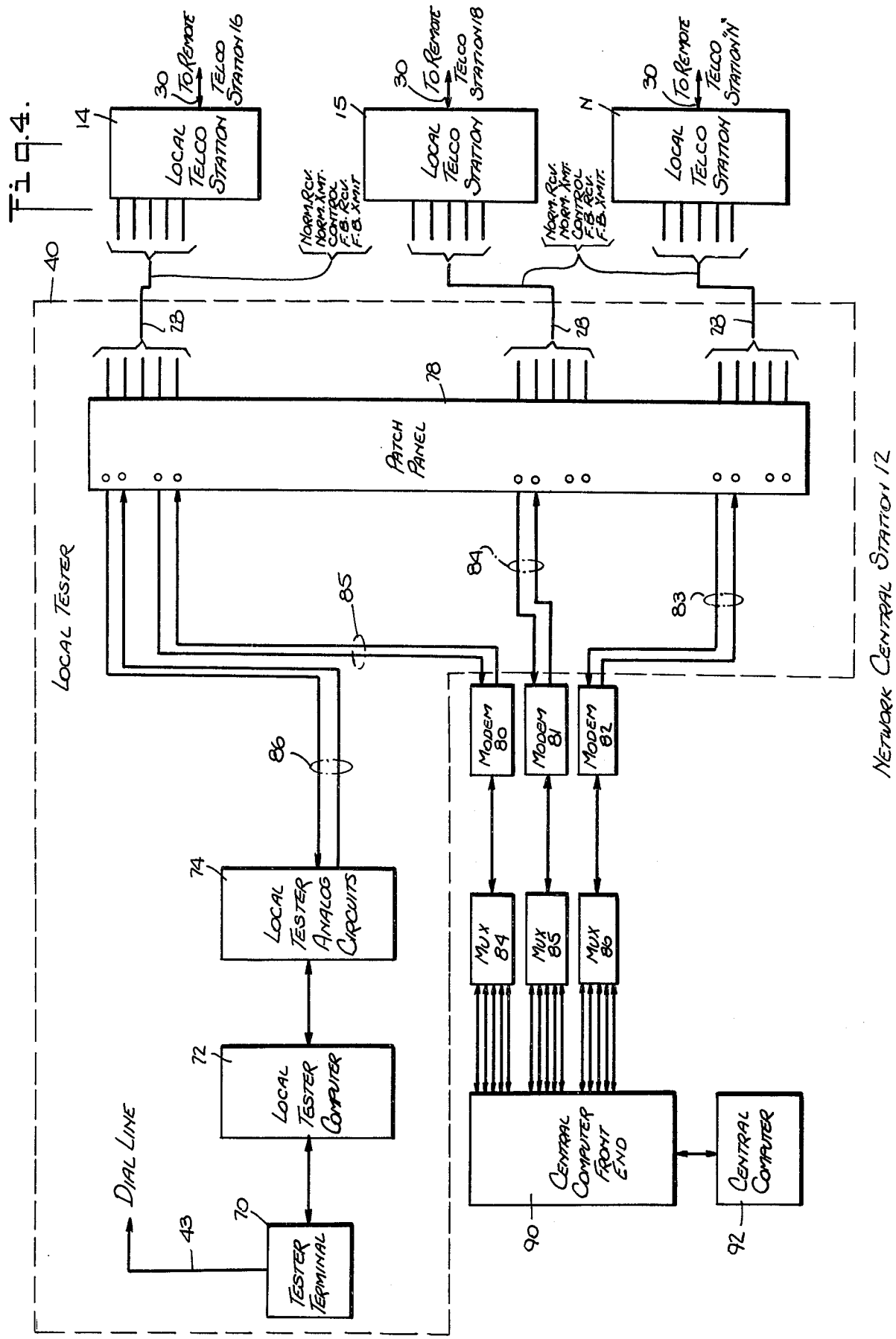
FIG. 4 is a block diagram of parts of the network of FIG. 1 and showing in greater detail the network central station according to the invention.

In FIG. 4 is shown a block diagram of the network central station 12, which includes local tester/switcher 40, high speed modems 80–82, multiplexers 84–86, central computer front end 90 and computer 92. As mentioned hereinabove, a local tester/switcher is preferred but not necessary in order to practice the invention disclosed herein. Commands to the tester system are issued on tester terminal 70, directly to the local tester computer 72 and on dial lines 43 to the remote testers. Local and remote test data are read-out on terminal 70. The local tester comprises in addition to terminal 70 and local tester computer 72, local tester analog circuits 74 and patch panel 78. The operation of the local tester 40 is similar to that of the remote tester 36 described hereinbefore and, therefore, will not be described in any detail. Briefly, the patch panel is used to connect the receive and transmit lines 28 (normal or fallback) from the local telephone stations 14, 15, N, to modems 80–82 over lines 83, 84, 85 and/or to the local tester analog circuits 74 over lines 86. Lines 86 are selectively connected in patch panel 78 so that lines 28 from telephone stations 14, 15 N to modems 80, 81, 82, respectively, can be tested. As shown in FIG. 4, lines 86 are connected for testing the lines from telephone station 14 and modem 80. The connection of the lines in patch panel 78 is similar to the connections shown in FIGS. 6–9 between the tester 66, telephone station 16 and modem 46. This permits normal data exchange between the remote users and the central front end 90 and permits network measurements and tests to be conducted. The local tester 40 can perform any of the tests and measurements that the remote testers can perform. Time-sharing of central computer 92 at the network central station proceeds in known manner via modems 80–82, multiplexers 84–86, central computer front end 90 and computer 92. While the local tester controls and tests in cooperation with many remote testers, further description of only one remote station will be made since the others will operate in similar manner.

TESTER SYSTEM OPERATION, GENERAL

Referring to FIGS. 3 and 4, the remote tester 60 is semiactive and upon command from the local tester terminal 70 performs programmed testing and switching at the remote station 22 and transmits information concerning the same to the local tester terminal 70 as well as initiating tests upon command to be completed at the local tester/switcher or other remote tester/-switchers. The remote tester 60, however, may operate independent of control from the local terminal 70 as from a program. The tester system includes the remote tester/switcher and the local tester/switchers which include tester computers to conduct local and remote testing. A local tester, however, is not essential. Also the central computer may effect local processing and control. Referring to FIG. 3, during normal network operation, remote line switch 61 connects modem 46 to the normal receive and transmit lines or to the fallback receive or transmit lines and remote line switch 62 connects modem 48 to the normal receive and transmit lines or to the fallback receive and transmit lines. At the same time, the receive and transmit lines to the tester analog circuits 66 may be connected to either or both of the normal or fallback, receive or transmit lines coming from the remote telephone company stations for testing during data transmission. In this way, data exchange between the network central station and the users is uninterrupted while network testing is being performed. The data flow between the network central station and the users may be interrupted and more intensive testing conducted. In such a mode, any or all of the modem receive and transmit lines are disconnected and the normal or fallback receive and/or transmit lines from the remote telephone company stations are connected directly to the tester analog circuits 66. A normal or fallback receive and transmit pair may be interconnected through the tester analog circuits 66 for loopback tests. Both remote tester 60 and local tester/-switcher 40 include test signal generating means, such test signal generating means in the remote tester transmitting test signals to the local tester/switcher and such test signal generating means in the local tester/switcher transmitting to the remote tester with provision for looping-back the test signal or an associated signal to its point of origin. The test signal generating means also provides signals for testing at the tester/switcher such as providing a test signal for the phase jitter test. The testers include programmable tester computers whereby test measurement data is processed and testing functions and sequencing are controlled.

TESTER SYSTEM OPERATION, DETAIL

Detailed description of the tester system will be made together with the description of specific tests and a block diagram (FIG. 5) of the tester analog circuits. Referring now to FIG. 5, a block diagram of the remote tester circuits is shown. The circuitry of the other remote testers and of the local tester is similar, and, therefore, will not be described. Analog circuitry is coupled to the line switches by input transformer 94 and output transformer 96 and more particularly either line switch 61 or 62 selectively connects a normal or fallback receive line from a remote telephone company station to the input transformer 94 and/or a normal or fallback transmit line to the output transformer 96. Resistor R1 is used to terminate the transmission line when it is disconnected from its normal termination in the modem. Relay 95 opens and closes switch S1 upon activation and deactivation of its coil by tester computer 68 through control register 69. Data transmission signals and test signals are thus fed to the analog circuitry and these signals may be looped-back or other test signals transmitted through the output transformer 96. Line switches are well known in the art and are available, for example, from T-Bar, Incorporated of Wilton, Conn. Variable gain amplifiers 98, 100 whose gain is controlled by the tester computer 68 through bi-directional control register 69 are serially connected to the input transformer and a receive filter 102 is connected to the output of variable gain amplifier 100. Tester computer 68 and bi-directional control register 69 may control the amplifier gain and other functions to be described hereinafter by program or upon command from the network central station. Connected to the output of receive filter 102 are C-message stage 104 and switch 106. Thus, receive signals fed to the input transformer 94 may be fed to the C-message stage 104 and other analog circuits for testing and/or to switch 106 to be transmitted to the remote line switch 61 or 62. The output of switch 106 is serially connected to variable gain amplifiers 108 and 110 whose gain is controlled by tester computer 68 through control register 69, and the output of amplifier 110 is also connected to the output transformer 96. The switch 106 is also controlled by the tester computer through the control register.

Analog testing circuitry in addition to the C-message stage 104 includes C-notch stage 112 connected to the output of the C-message stage 104, and comparator 114 connected to the output of the C-notch stage 112. C-message stage 104, C-notch stage 112 and comparator 114 operate in cooperation with tester computer 68. Analog references are provided for the comparator 114 by digital-to-analog converter 116 which converts digital references from tester computer 68 through control register 69 to analog references for the comparator 114. A phase-locked oscillator 118 (VCO) is provided to generate test signals to be transmitted to the local tester/switcher and to conduct phase jitter tests wherein the VCO is controlled by phase-locked loop 119 and the tester computer 68 through control register 69. In the receive filter, and in the C-message and C-notch stages are switches which provide a parallel short-circuit to the signal to by-pass these stages under control of the tester computer through the control register. The comparator 114 which is described more fully hereinafter includes means for comparing positive and negative parts of a signal to make absolute value comparisons. The output of phase-locked oscillator (VCO) 118 is connected to switch 106 and to frequency divider 120. The output to frequency divider 120 is used for phase jitter measurements as described hereinafter and the output to switch 106 is used to provide test signals to be transmitted to the central office and/or to other testers. Parameters of the output signal of oscillator (VCO) 118 are controlled by the tester computer through the control register and by the phase-locked loop whereby output signals of varying parameters are obtained.

Not only are the switches well known in the art as mentioned hereinabove, but the amplifiers, filters, detectors, switches, transformers, phased-lock loop components including the VCO, digital latch, digital-to-analog converter, control register and the tester computer are also well known to those skilled in the art. Programs for programming the tester computer to accomplish the switching and tests described hereinbefore and those described hereinafter can easily be constructed by those skilled in the art. The tester computer treats the tester and its circuitry, the receive only and originate/receive modems and the line switches as peripheral devices.

Specific tests will now be described with respect to tester/switcher 36. Referring to FIGS. 6-9, a portion of the network remote station 22 is shown. Connections made by the remote line switch 61 between the telephone long-lines station 16, the tester analog circuits 66 and the modem 46 and multiplexer 42 are shown diagrammatically.

Figure 7:
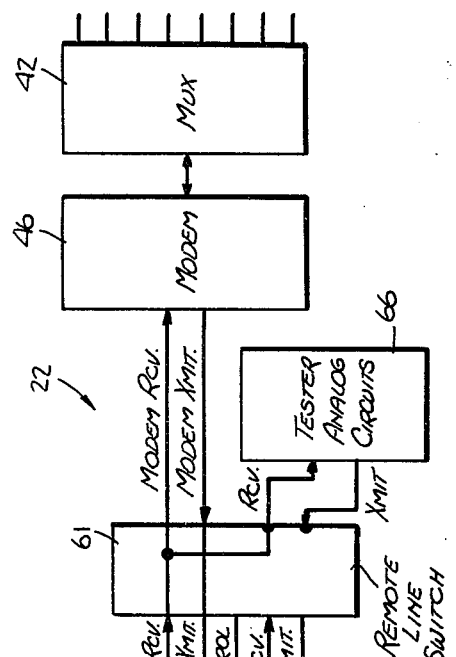
FIG. 6-9 are block diagrams of parts of the remote tester/switcher of FIG. 3 showing switch connections between the tester/switcher and the network.
Figure 8:
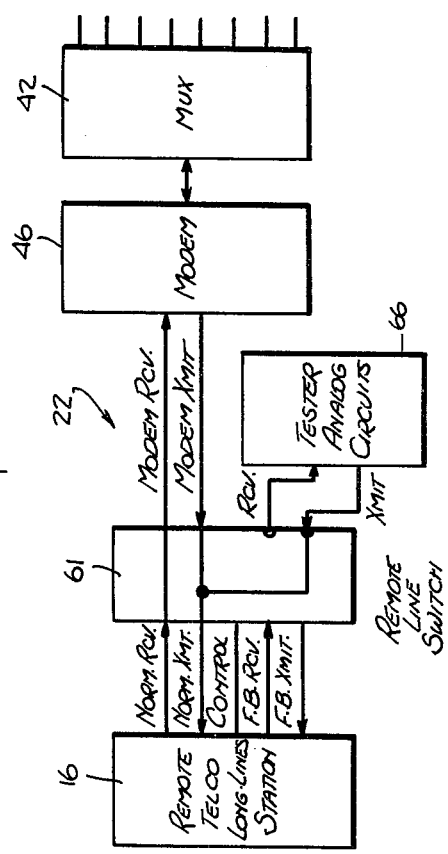
Figure 6:
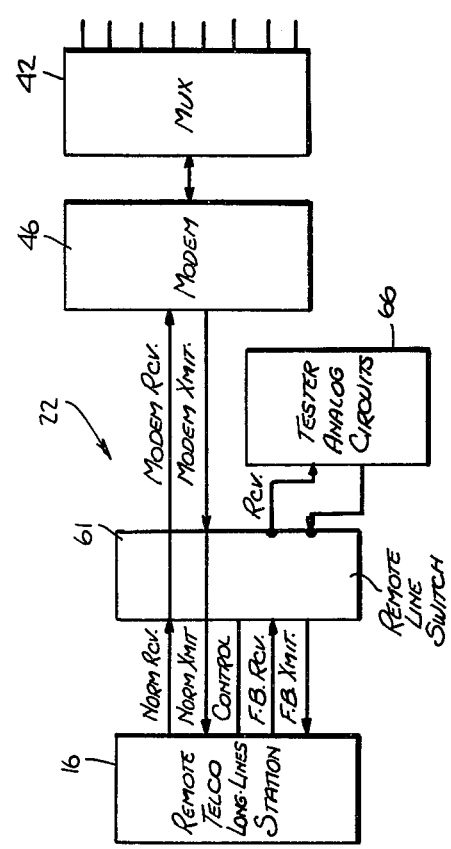

FIG. 6 shows the connections in the network remote station 22 for normal data exchange between the network central stations and users serviced by the remote station 22. In this mode, receive and transmit lines from the telephone station 16 are connected to the modem 46 and no connection is made to the tester circuitry. While the normal receive and transmit lines from the telephone station have been shown connected in FIG. 6 (and in FIGS. 7-9 as well), alternately the fallback receive and transmit lines may be connected in FIG. 6 (and in FIGS. 7-9 as well). In the mode shown in FIG. 6, no testing or measurements are conducted with respect to the data transmission lines. However, in this mode, the tester/switcher may provide status to the calling terminal to indicate line switch and program status. Test results, data, etc., and commands are transmitted over dial lines. Some testing and measuring may be done while the network remote station 22 is connected for data transmission between the network central station and users served by the remote station 22. As shown in FIGS. 7 and 8, the receive and transmit lines, respectively (normal or fallback), may be connected to the tester circuitry 66. The connections shown in FIGS. 7 and 8 may also be used to conduct tests and measurements while the network remote station 22 is in a non-data exchange test mode. The tests and measurements which may be performed with the connections shown in FIGS. 7 and 8 will be described hereinafter and include but are not limited to receive and transmit signal level tests. Such tests may be of the "go", "no-go" type in which a determination may be made with respect to the performance of the tested lines and whether data exchange between the network central station and the network remote station should be switched to fallback lines or terminated.

Figure 9:
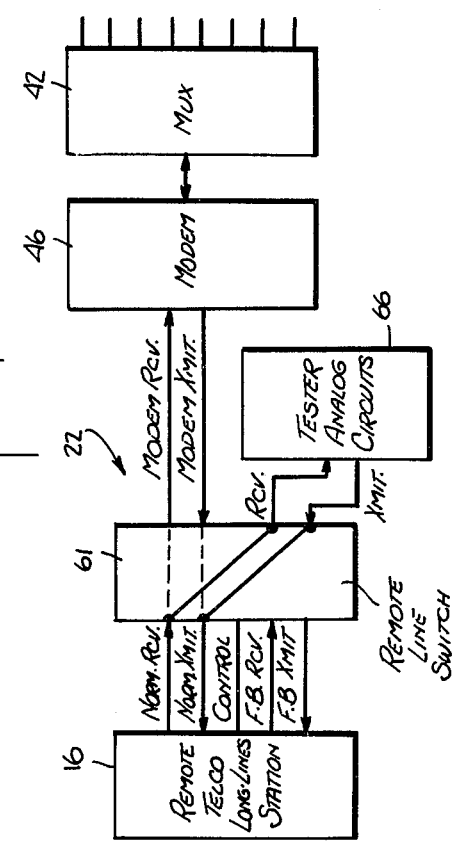

FIG. 9 shows connections in the network remote station 22 for non-data exchange test modes wherein the lines to the modem may or may not be disconnected. The connections shown in FIGS. 7 and 8 may also be used in a non-data exchange test mode as mentioned hereinabove. The connections shown in FIGS. 7-9 may be used to conduct tests, etc. which include but are not limited to background noise tests including C-message and C-notch, loop-back tests of many types including tests conducted over the data transmission lines and the dial lines, phase jitter, and amplitude hits and drop-outs. These tests will be described hereinafter.

These tests mentioned hereinabove may be conducted both at the network central station and at remote network stations individually and by cooperation by the local and remote tester/switchers and the local tester terminal 70 to perform testing in varying degrees of control by the remote stations and network central station. As described hereinbefore for FIG. 2, two remote tester/switchers may be serially and simultaneously controlled by the network central station through one of the tester/switchers.

PHASE JITTER

Phase jitter measurements in the network between two locations, for example, between the network central station and a network remote station or between two network remote stations, are accomplished by transmitting a signal between the locations of interest and having the tester/switcher in the receiving location measure the phase jitter of the transmitted signal. As mentioned hereinbefore, in accordance with the present invention, phase jitter of a signal (149) to be tested having a frequency $f$ (indicating that the signal may have phase jitter) is measured by generating a first phase stable signal (153) at a multiple nf ($f$ being an average frequency which is equal to $f$) of the frequency $f$ of the signal to be tested and a second phase stable signal (154) at the same frequency $f$ as the signal to be tested such that selected zero crossings of the second signal (154) and the signal (149) to be tested are on the average in phase. The number of cycles of the signal (153) generated between the selected, in-phase zero crossings and the next zero crossing of the signal (149) to be tested are counted and the difference in successive counts of the number of cycles is a measure of phase jitter.

Referring now to FIG. 5, means for measuring phase jitter in a tester/switcher are shown. The switcher connections of FIGS. 7-9 may be used to measure phase jitter and are made in non-data exchange modes. The signal to be tested (test signal), is received by the tester analog circuits and progresses through amplifiers 98 and 100, and filters 102, 104 and 112. Filters 104 and 112 are by-passed as described hereinbefore. The incoming signal 149 at frequency $f$ is fed to limiter 150 to convert the test sinusoidal signal 149 to a test square wave 151 also at frequency $f$. A phase-locked loop 119 is used to generate a phase-stable signal or clock 153 at frequency nf and a phase-stable second square wave 154 at frequency $f$ in which the positive-going edges of the second square wave 154 are in phase with the positive-going edges of the first square wave 151. The phase-locked loop 119 comprises phase detector 155, filter 156, VCO 118 and counter 120. Level shifters 170–172 are provided to couple the different circuits at compatible levels. The phase-locked loop and the components comprising the loop shown in FIG. 5 are known in the art. Filter 156 includes integrating means having a long time constant such that the frequency of the phase stable square wave 154(f) and the phase-stable clock 153(nf) do not follow fast, short term frequency changes in the signal to be tested 149(f$\phi$), but rather the frequency of those signals follows the frequency of the signal to be tested for frequency changes occurring slowly, such as, for example, drift.

Figure 10:
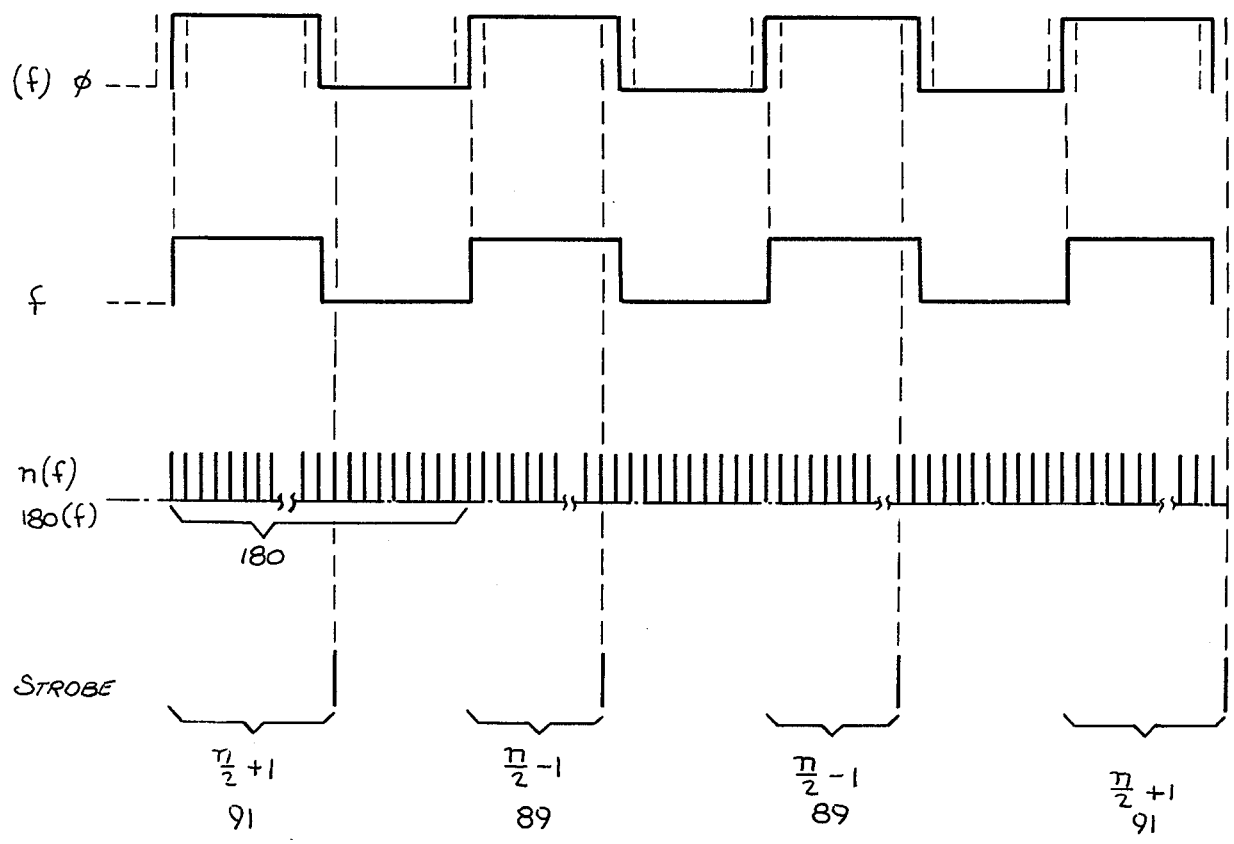
FIG. 10 is a timing diagram illustrating the operation of the method and apparatus of the embodiment shown in FIG. 5 for measuring phase jitter.

Timing for the operation of the circuitry of FIG. 5 is shown in FIG. 10. Counter 120 continually counts clock pulses 153 from VCO 118 and is reset by the positive-going edge of square wave 154 (from output 173 to reset 174 of counter 120) which is in phase with the positive-going edge of square wave 151. Thus counter 120 continuously counts clock pulses from 1 to n and is reset. The binary count of counter 120 is fed to the inputs of latch 176. Latch 176 transfers the binary levels present at its input to its outputs upon being strobed by the output 180 of synchronizer 178. Counter 120 acts as both a divider to count down the clock to provide the phase-stable square wave 154, and as a counter to count the number of clock pulses, differences in successive counts of which approximate the phase jitter. Thus, output 173 of counter 120 provides square wave 154 whose positive-going edge resets counter 120 at input 174 after the counter counts n clock pulses. The frequency of the input signal is typically approximately 1000hz. If n is advantageously selected to be 180, then VCO output 153 (nf) to counter 120 is at approximately 180,000hz. Input 175 from the control register is used to preprogram and/or preset counter 120 to divide by 180. Thus, counter 120 continually counts from 1 to 180 and the 8 bit binary code for the count is connected to latch 176. Latch 176 is strobed at the appropriate time by strobe 180 to transfer the counter outputs to the latch, which are in turn connected to the tester computer and control register. Thus, the tester computer receives directly the phase-jitter information. Counter 120, continuously counting clock pulses from 1 to 180, is strobed immediately after the negative-going edge of square wave 151, to transfer the counter binary count to the latch outputs. However, phase jitter moves the zero crossings of the sine wave 149 and correspondingly the postive and negative-going edges of square wave 151. Therefore the count strobed through latch 176 immediately after a negative-going edge of square wave 151 may change from strobe to strobe if there is phase jitter present. The difference in successive counts is an approximation of the phase jitter. The measurement will be accurate to the least significant count and n is, of course, chosen to be sufficiently large to give the desired resolution and accuarcy. For example, if n equals 100, then phase jitter can be determined to 1% resolution. Accordingly, n is preferably chosen to be greater than 100. For example, if there is no phase jitter, there will be no change in successive strobed counts of counter 120 at latch 176. If jitter is present, the successive counts will vary, and peak-to-peak phase jitter is the difference between successive counts. For example, n is advantageously chosen to be 180 such that each count represents 2° of phase jitter up to a maximum of 360° (±180°). To accomplish this, VCO 118 generates a clock signal at a frequency of 180 times the frequency of the signal to be measured and counter 120 divides by 180. When there is little or no phase jitter, the stobed count will be unchanging from count to count. If there is phase jitter, successive counts will vary for example as follows: 91, 89, 89, 91 and the peak-to-peak phase jitter will be four degrees. The circuit for measuring phase jitter shown in FIG. 5 is particularly advantageous in that the binary levels present at the output of the latch provide a direct binary readout of phase-jitter and when n is chosen equal to 180, a direct binary readout of phase jitter in 2° increments.

Typically, individual tests are made at spaced intervals rather than at each cycle of the test signal. The intervals are determined by the tester computer which gives a read command to "read" the output of latch 176. The read command from the computer is typically asynchronous with respect to the signal used to make the phase-jitter measurement and must, therefore, be synchronized. Read signal 182 is fed to synchronizer 178 together with clock signal 153 and square wave 151. Strobe signal 180 to latch 176 is synchronized to occur after a read signal 182 and after the occurance of a next negative-going edge of square wave 151 and on the next clock pulse 153. The tester enable 179 is used to enable latch 176 via output 181 to read a phase-jitter measurement and automatically cause a next phase jitter measurement to be made. Read command 183 to the tester enable from the tester computer is used to provide the enabling output 181 to the latch and the read signal 182 to the synchronizer. Circuitry to accomplish the synchronizing and enabling is known in the art and typically includes known logic circuits including gates and flip-flops. Synchronzation of the asynchronous read command with the square wave 151 and clock pulse 153 is necessary to avoid strobing the latch before the occurence of the negative-going edge of the square wave 151 or during a change in count by the counter which may at that time have an erroneous changing count. Programs may easily be constructed by those skilled in the art to control and perform the phase jitter test as described hereinbefore through bi-directional control register 69 and tester computer 68 and to process the results. The result of each individual test may be relayed to the network central station through one of the modems 53, 54, or processing may be done by the tester computer and results such as "go" "no-go" relayed to the network central station.

In accordance with the invention, the phase jitter of any periodic signal is measured and a digital indication thereof given. Further, no calibration is required and the test is self-adjusting since: (a) the frequency division used for generating the reference square wave to the phase detector is determined by a fixed number and counter 120 divides by that fixed number unaffected by frequency changes; and (b) the frequencies used in the test including that of the reference square wave to the phase detector follow the incoming frequency by means of the phase-locked loop. Counter 120 is utilized for two test functions: (1) providing the reference square wave to the phase detector which square wave is also used to reset the counter; and (2) counting the clock pulses the results of which are strobed through the latch to provide a binary number which approximates the phase jitter. By way of illustration, the signal has been described with respect to FIG. 5 to be a sinusoidal signal which is converted into digital form. However, the phase jitter of other signals such as, for example, sawtooth, triangular, etc., may also be measured in accordance with the invention disclosed herein.

SIGNAL LEVEL TESTS

Signal level measurements may be made in data exchange and non-data exchange modes using the connections shown in FIGS. 7-9. The tests may be conducted with respect to normal or fallback lines, for transmit and receive levels, and may be made at the network central station by the local tester/switcher, at the remote stations by remote tester/switchers, at the local and remote locations by cooperation between the local and remote tester/switchers, and at remote locations by cooperation between remote tester/switchers. Once the connections are made and the signal which may be a test signal or a data signal is transmitted, the manner of making the measurement of the signal levels at the different locations, for the different lines (normal or fallback) and for receive and transmit are substantially the same, there being differences in parameters in the respective tester/switcher such as, for example, gain and the like.

The present invention provides for the measurement of the signal peak, the signal average and the signal power.

As mentioned hereinbefore, in accordance with the invention, the peak value or magnitude of a signal is determined by: (a) sequentially establishing a plurality of reference magnitudes, a respective reference magnitude being established for at least that part of the signal cycle during which the signal is at its peak magnitude; (b) comparing the peak signal magnitude and each sequentially established reference magnitude to obtain respective coded levels, preferably binary, corresponding to each comparison; (c) varying a next respective reference magnitude; and (d) forming a code notation from the coded levels which approximates the peak signal magnitude. According to a preferred embodiment, the greatest reference magnitude is established and compared first and successively decreasing reference magnitudes are sequentially compared thereafter. However, the successive comparisons may be by the method of successive approximations, i.e., by decreasing (or increasing) successive reference magnitudes depending upon the comparison result by the previous reference magnitude by fractions of previous reference magnitudes and differences therebetween. The code notation according to a preferred embodiment is binary in which the binary comparison levels are processed to form a binary coded number which approximates the peak signal magnitude. It is preferred that individual peak signal magnitudes are determined $N_p$ times and that the peak signal magnitude is designated as that magnitude obtained in a majority of the $N_p$ consecutive determinations. According to a preferred embodiment, $N_p$ is taken equal to 8 and the majority is 5. The reference magnitudes are varied in discrete steps of equal magnitude or in discrete steps of decreasing magnitude (successive approximations).

Referring now to FIG. 5, the reference magnitudes are generated in coded binary by tester computer 68 which commences the measurement with the generation of the greatest reference magnitude. The digital references are converted to analog voltages by the digital-to-analog (D/A) converter 116. The signal to be measured, for example, on the normal receive line, is switched to input transformer 94 by line switch 61 and is fed to comparitor 114 through the filters and amplifiers shown in FIG. 5 to be compared with the analog voltage references in comparator 114. For each digital reference generated by tester computer 68 a comparison is made by comparator 114 between the signal voltage and the analog voltage corresponding to the digital reference. The comparison result is a binary level, i.e., a logic 0 or logic 1. For purposes of illustration, the output of comparator 114 is a logic 0 if the reference exceeds the signal absolute magnitude and a logic 1 if the signal absolute magnitude exceeds the absolute magnitude of the reference. According to a preferred embodiment, the number of references generated is 64 or $2^6$ corresponding to 6 digital bits. The binary level for each comparison is entered into tester computer 68 through bi-directional control register 69. After 64 references have been generated, the tester computer provides a binary coded number approximating the peak signal magnitude taking into considertion the filters and amplifiers which the tester computer controls. Each peak magnitude measurement or certain of them may be stored or relayed to the network central station or otherwise used by the tester computer. The tester computer may also provide references in accordance with the method of successive approximations. While a full sequence of reference magnitudes is required to determine each individual peak magnitude where the references decrease by equal magnitudes, a lesser number may be required when using the successive approximation method. In the successive approximations method, the minimum number of reference magnitudes required will depend upon the peak signal magnitude and the minimum difference between successive reference magnitudes; where the number of reference magnitudes corresponds to 6 digital bits, the peak signal magnitude may be determined in a minimum of six steps. In accordance with a preferred embodiment of the invention, the references are generated asynchronously with respect to the signal but are maintained long enough so that the peak signal magnitude occurring during at least one signal cycle is compared to each reference magnitude. Thus, the measurement is essentially independent of signal waveshape and frequency and therefore not limited by bandwidth. Programs to perform the foregoing peak magnitude measurements may easily be constructed by those those skilled in the art.

Figure 12:
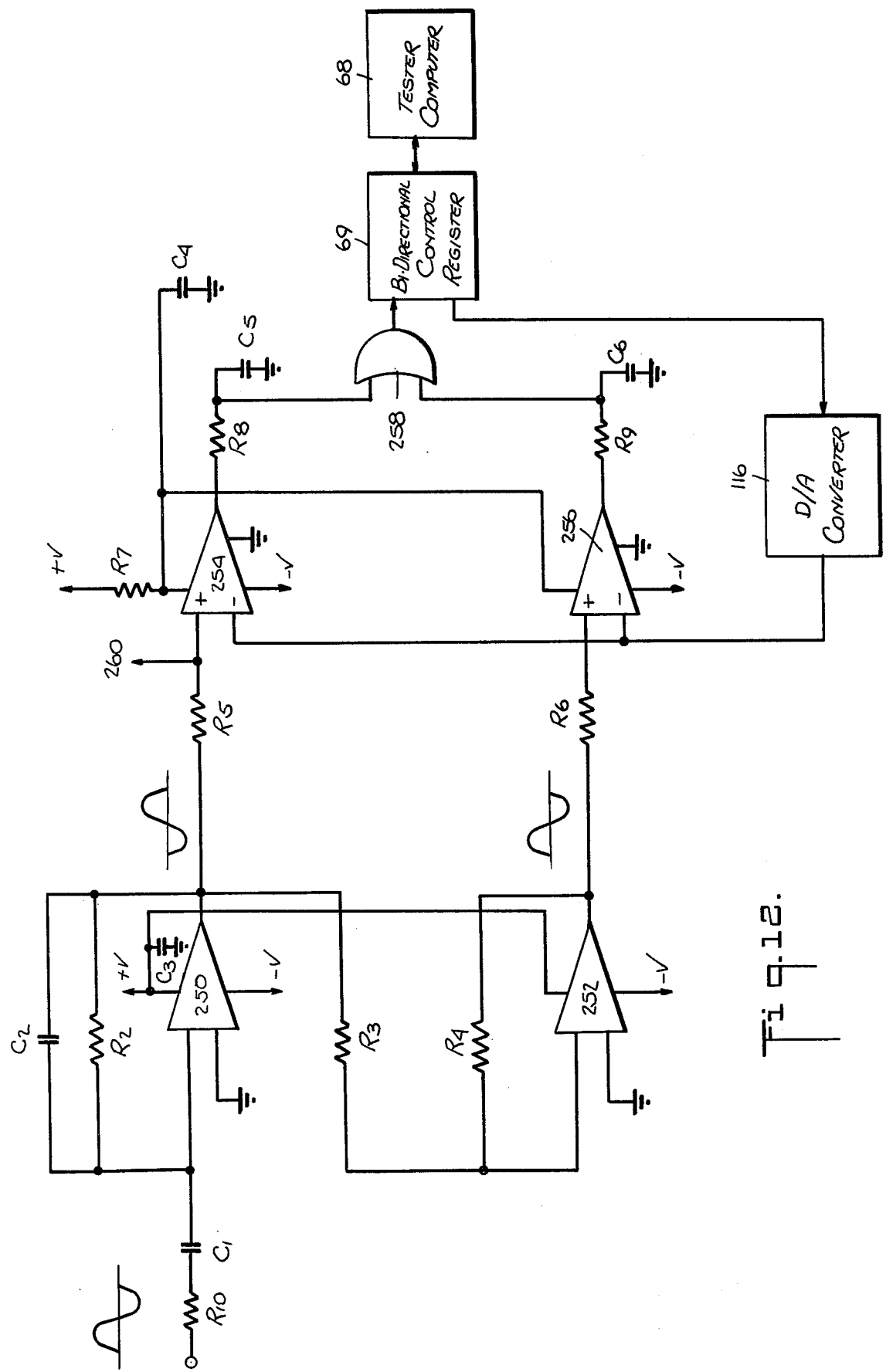
FIG. 12 is a circuit diagram of a preferred embodiment of an absolute magnitude comparator according to the invention.
Figure 13A:
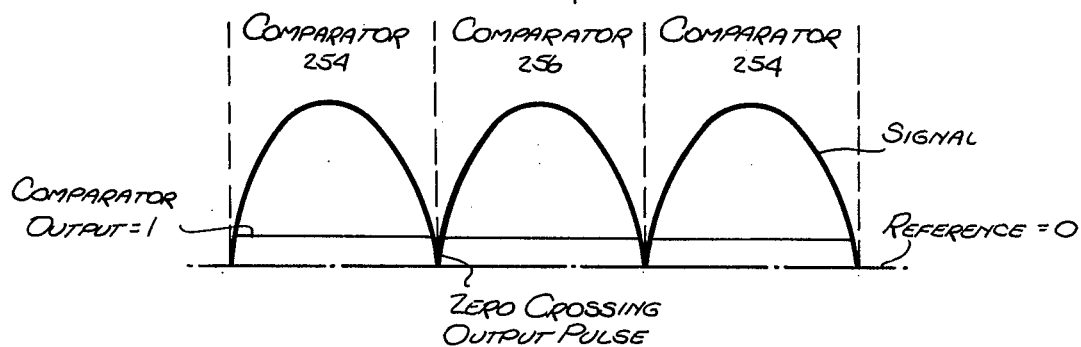
FIGS. 13A-13D are wave shape and timing diagrams illustrating the operation of the circuit of FIG. 12.
Figure 13B:
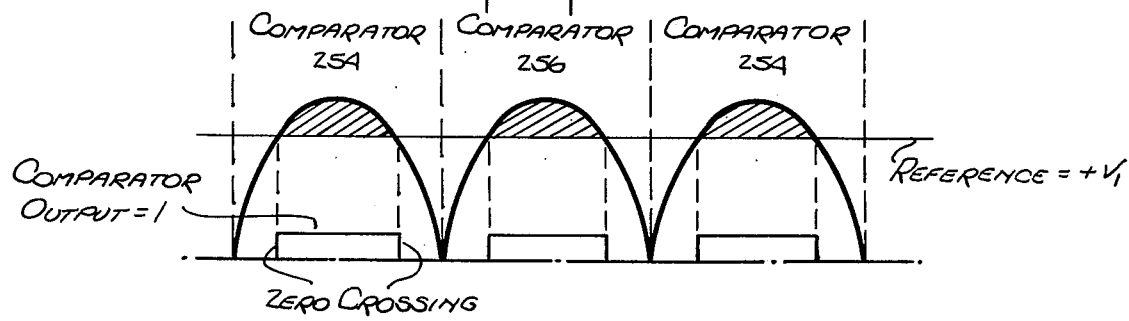
Figure 13C:
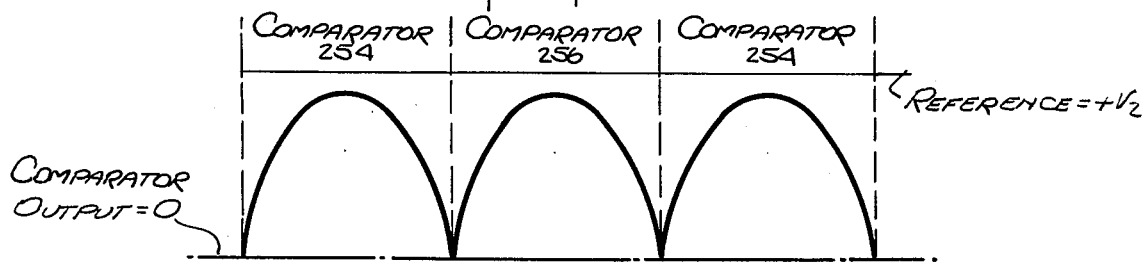
Figure 13D:
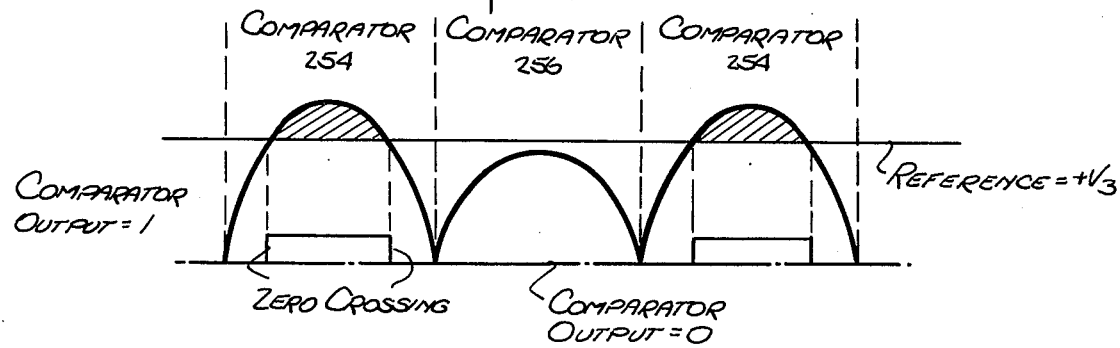

Peak value or magnitude as used herein means the largest instantaneous value or magnitude of a periodic time function during a specified time period. A circuit for making absolute value comparisons is shown in FIG. 12 and described hereinafter.

Further in accordance with the invention, as mentioned hereinbefore the average value or magnitude is determined by: (a) establishing a plurality of pairs of reference magnitudes, each reference magnitude being maintained for the specified time period corresponding to the average measurement and each pair defining a reference magnitude level; (b) comparing the signal magnitude with at least each pair of reference magnitudes at a plurality of instances during the specified time period to determine weighted contributions of each reference magnitude level to the average value; and (c) summing each weighted contribution. Each weighted contribution is determined by the product of each reference magnitude level and the weighting ratio P corresponding to the respective magnitude level. The weighting ratio P is as described hereinbefore and the signal average value, $S_{av}$, is, then: as described hereinbefore, $$S_{av} = \sum_{n=1}^{N} \Delta P \frac{(S_n + S_{n-1})}{2}.$$

Average signal value, magnitude or amplitude as used herein means the average of the instantaneous value, magnitude or amplitude of the signal over a specified time period and may be represented by the equation:

$$\frac{1}{A} \int_{t}^{t+A} S dt;$$

Where A is the specified time period and S is the instantaneous signal value as a function of $t$.

It will be observed that the signal need not be periodic to determine its average value where the reference magnitude pairs are established simultaneously for the specified time A.

Average power is determined in accordance with the invention, as described hereinbefore, by summing the square of the weighted contributions of the absolute values of the reference magnitudes as follows:

$$P_{av} = K \sum_{n=1}^{N} (|P_n - P_{n-1}|) \frac{(S_n + S_{n-1})^2}{2}$$

where K is the system proprotionally constant and includes the resistance and other system parameters.

As can be seen, the measurement of average and peak magnitude according to the invention is essentially independent of wave shape and frequency and accordingly is not bandwidth limited.

Measurement resolution and accuracy are limited by the number of reference magnitude levels employed and to the difference in magnitude between the reference magnitudes of the pair constituting the magnitude level and there can be an error for each level measurement by as much as the difference in magnitude between the references of the pair. Accordingly, a sufficient number of magnitude levels are chosen and the difference between reference magnitudes of the pairs is chosen to be sufficiently small to satisfy the resolution and accuracy requirements at hand. The precise error for each level varies statistically since the actual signal can fall anywhere in the reference magnitude level and, in accordance with the invention, the overall or net error for the average value measurement, which is a summation, will tend to be minimized. Also, where the interpolated value is taken midway between reference magnitudes, the maximum error is reduced to half the difference in magnitudes between references of the pair.

By way of illustration, testing of the normal receive signal level in a non-data exchange mode will be described. Referring in particular to FIG. 9, the normal receive line from remote telephone station 16 is connected to the tester analog circuits 66. A 1000 hz. test signal is transmitted to the network remote station at which the recieved signal is to be tested. Referring to FIG. 5, the gain of amplifiers 98 and 100 and the characteristics of filter 102 are set in accordance with parameters of the transmitted signal and network parameters, and the C-message and C-notch stages are by-passed as described hereinbefore. The signal is compared in comparator 114 with reference magnitudes supplied by digital-to-analog (D/A) converter 116. The levels of the D/A converter 116 are controlled by the tester computer 68 through bi-directional control register 69 and are sequentially individually established as described hereinbefore for the peak measurements with the greatest reference magnitude being generated first. However, comparisons are made N times with each reference magnitude before the next smaller reference is generated. Comparator 114, as in the peak measurements, has a binary level output depending on the result of the comparison (logic 0, if the reference exceeds the signal; logic 1, if the signal exceeds the reference). The binary level for each comparison is entered into the tester computer 68 through control register 69. According to a preferred embodiment and as for the peak measurements, the number of reference magnitudes generated is 64, and each reference magnitude is compared to the signal 100 times, N being equal to 100. After a sequence is completed, i.e., after 64(100) comparisons, the tester computer provides a binary coded number approximating the average signal magnitude taking into consideration the filters and amplifiers which the tester computer controls. Thus, the tester computer computes for pairs of reference magnitudes the weighting ratio $\Delta P$ and the interpolated magnitude $$\frac{(S_n + S_{n-1})}{2}$$

and sums these over the sequence. As mentioned hereinbefore, the references may be generated asychronously with respect to the signal and also aperiodically. According to a preferred embodiment, the references are so generated, obviating the need for additional timing and sychronizing and, more importantly, making the samplings psuedorandom to thereby make the measurement essentially statistical. The results of each measurement may be relayed to the network central station, stored, or otherwise used by the tester computer. Average power is determined by the tester computer by squaring the interpolated magnitudes and summing the squared magnitudes times the weighting ratios.

Programs to perform the foregoing measurements may easily be constructed by those skilled in the art.

FIG. 11 illustrates the measurement of average signal level according to the invention. A sinusoidal signal and sequentially established reference magnitudes referred by V5, V4, V3, V2, V1 are shown in FIGS. 11A-11E. 64 reference levels are actually established; however only those five are shown for clarity. The reference magnitudes are maintained for a sufficient time to compare the signal and each reference magnitude N times, typically at least 100. For clarity, only ten comparison times $t_1$–$t_{10}$, have been shown. The reference magnitudes are generated asynchronously with respect to the signal and the comparisons, $t_1$–$t_{10}$, are made aperodically for reasons described hereinbefore. The sinusoidal signal has been shown in separate segments for convenience, but it is to be understood that the measurement is typically made on a free-running signal and the reference magnitudes are sequentially, asynchronously generated in decreasing order from V5 to V0 (V0 not being shown in FIG. 11) and maintained for a sufficient time to make N comparisons. The comparisons may be made with the circuit shown in FIG. 12 and described hereinafter. Reference voltages V5 to V0 are each sequentially established by the D/A converter 116, the control register 69 and the tester computer 68 for a predetermined period of time and the results of the comparisons between the signal voltage and the reference voltages at respective times $t_1$–$t_{10}$ are processed by the tester computer 68, which is programmed in known manner to establish the references and make the comparisons at the proper times. It is pointed out that since D/A converter 116 is not "sampling" the signal, the measurement is not dependent upon the bandwidth of the D/A converter. The tester computer is further programmed in known manner to count the number of times the signal exceeds each reference voltage at times $t_1$–$t_{10}$ and to compute the parameters $|P_n - P_{n-1}|$ and $$\frac{(S_n + S_{n-1})}{2},$$

and average magnitude therefrom as follows. Referring again to FIG. 11, each voltage reference is compared to the signal at times $t_1$–$t_{10}$ and the number of times the signal exceeds the reference is counted. The results are tabulated in Table 1 below:

TABLE 1

| Voltage Reference | Number of times Signal Exceeds Reference | $P_n$ | $\|p_{n}-P_{n-1}\|$ |
|---|---|---|---|
| V5 | 0  | 0   | .1 |
| V4 | 1  | .1  | .2 |
| V3 | 3  | .3  | .5 |
| V2 | 8  | .8  | .2 |
| V1 | 10 | 1.0 | .0 |
| V0 | 10 | 1.0 | —  |

For example, the signal did not exceed reference V5. However, the signal exceeded references: V4 one time at $t_2$; V3 three times at $t_1$, $t_4$, $t_8$; V2 eight times at $t_1$, $t_2$, $t_4$, $t_5$, $t_7$14 $t_{10}$. During the references V1 and V0, the signal exceeded the reference ten times (at all of the comparison times). The weighting ratio P is determined for each reference magnitude level, i.e., for the levels bounded by pairs V0 and V1, V1 and V2, V2 and V3, etc., by taking the difference between the number of times the signal exceeds one reference of the pair and the number of times the signal exceeds the other reference of the pair and dividing by the total number of comparisons (10). Accordingly, the weighting ratio for the V0/V1 level is: $P_0 = 1.0$, $P_1 = 1.0$, and $P_0 - P_1 = 0$. Similarly, the weighting ration for the V1/V2 level is: $P_1 = 1.0$, $P_2 = 0.8$, and $P_1 - P_2 = 0.2$. The weighting ratios for the other levels are similarly determined by determining $P_n$ and taking the difference between successive $P_n$'s. The interpolated value assigned to each reference level is that of the value midway between the references of the pair or $$\frac{S_n + S_{n-1}}{2}.$$

The weighting ratio is multiplied by the interpolated value and the products, $$(|P_n - P_{n-1}|)\frac{(S_n + S_{n-1})}{2},$$

are summed to arrive at the average voltage of signal S, and the products $$K(|P_n - P_{n-1}|)\frac{(S_n + S_{n-1})^2}{2}$$

are summed to arrive at the average power of the signal in accordance with the equations:

$$S_{av} = \sum_{n=1}^{N}(|P_n - P_{n-1}|)\frac{(S_n + S_{n-1})}{2};$$

$$P_{av} = K\sum_{n=1}^{N}(|P_n - P_{n-1}|)\frac{(S_n + S_{n-1})^2}{2}.$$

While only six reference magnitudes have been described in the illustrative example for clarity, it is understood that 64 references are used corresponding to six digital bits. Similarly, only ten comparison times have been used and it is similarly understood that more than about ten are used, for example 100 or more. The comparisons with each reference need not be done during any predetermined number of cycles and may be done over one or more cycles for a periodic signal. As discussed hereinbefore, increasing the number of references and comparison times and reducing the magnitudes between references pairs will increase accuracy and resolution. While S in FIG. 11 has been shown to be periodic, the average value of non-periodic signals may also be obtained according to the invention as described hereinbefore. Also S has been shown to be a sinusoid. However, it is to be understood as described hereinabove that S may have any shape and frequency, the frequency being limited by the comparison speed. Referring again to FIG. 11, signal S is shown to be positive. Obviously, measurement is not limited to a positive signal and where signals having negative amplitudes are measured, the average value may be measured as described hereinafter with respect to FIG. 12.

AMPLITUDE HITS AND DROP-OUTS

Rapid changes in the amplitude of a received signal over relatively short periods of time are also measured by the tester/switchers. Any change in amplitude of a received signal within a specified time which exceeds predetermined upper and lower thresholds is termed an amplitude hit and may be the result of an instantaneous network gain change or incidental noise on the received signal. In accordance with the invention, a sinusoidal, typically 1000hz, test signal is transmitted from a distant location to a tester/switcher in which the receive line has been connected to the tester analog circuits (FIGS. 7 and 9). The peak magnitude of the received test signal is determined as described hereinbefore. Tester computer 68 determines upper and lower thresholds which are typically three decibels (db) above and below the measured peak value. These threshold magnitudes are established by the D/A converter 116 and tester computer at predetermined times and fed to the absolute value comparator 114. It is not desired that very closely grouped signal changes which otherwise qualify as amplitude hits be measured. Accordingly, after a hit has occurred, the next measurement is made a predetermined time later, typically 150ms. Thus, the maximum number of hits which could be measured is about 7 per second. Once the peak magnitude of the signal has been measured, a test is commenced by determining the start of each half-cycle or each zero crossing and comparing the signal to the threshold magnitudes a predetermined time later. Comparator 114 may be used to determine zero crossings. The predetermined time is selected to correspond to the expected peak value of the signal. For a 1000 hz test signal, the peak value expected is about 250 $\mu$s after a zero crossing. Accordingly, at about 250 $\mu$s after each zero crossing, the threshold magnitudes are fed to the comparator and determinations made as to whether the signal exceeded either threshold as described hereinbefore. If the signal did, a hit has occurred. The tester computer receives the binary indication from comparator 114 and may store, relay to the central office or otherwise use the information. The tester computer is programed to make a new peak value determination after each hit and to determine new threshold magnitudes based on the new peak value. Furthermore, the tester automatically adjusts an input attenuator (either or both of variable gain amplifiers 98, 100 used as attenuators) to place the input signal level into the proper measurement range. Thus, the tester/switcher is self-adjusting to the input test signal and tracks the input signal similar to an automatic gain control. The value of the input attenuators as well as that of the measured reference voltage are available for display and/or logging. Programs to perform the foregoing can easily be constructed by those skilled in the art.

If there are no hits, the tester/switcher is programmed or operator controlled to make tests during predetermined periods of time, typically every 10 seconds, to determine if the signal exceeds a minimum value or if a drop-out has occurred as described hereinbelow. If there is no signal, or it is too small, the tester/switcher is programmed to indicate the same.

A drop-out occurs when the signal is a negative hit which exceeds a lower threshold of a predetermined value.

IMPULSE, C-NOTCH AND C-MESSAGE NOISE

Typically, impulse noise is additive to the signal and is manifested by spikes caused by electromagnetic interference such as the starting and stopping of electric motors, by 60 hz interference, etc. The presence of such impulses on the signal are not to be designated amplitude hits. Impulse noise may be defined as transient noise which exceeds expected receive levels.

The measurement of impulse noise is made with the tester/switcher connections shown in FIGS. 7 and 9 and is made with no signal transmitted to the tester/switcher and the C-message stage activated to weight the noise. Impulse noise is a peak measurement measured as described hereinbefore for amplitude hits wherein a threshold is used except that the reference magnitudes are maintained for predetermined periods of time or for the duration of the impulse noise measurements rather than being generated a predetermined time after a zero crossing. Each time impulse noise exceeds the threshold, an inpulse noise hit is registered by the CPU and an indication thereof given. Each test is typically run for a predetermined period of time, for example, 15 minutes, and a predetermined number of hits during that time indicates excess impulse noise, for example, 15 in 15 minutes for a given level of signal. Programs for performing the foregoing measurements are easily constructed by those skilled in the art.

The measurement of noise with a test signal notched out is termed C-notch noise and is made with the C-notch and C-message stages activated in the manner of making average measurements as described hereinbefore but in the absence of a signal.

C-message noise may be measured by making an average signal measurement as described hereinbefore, in the absence of a signal, but with the C-message stage activated.

Flat noise may be measured by making an average measurement in the absence of signal with the C-notch and C-message stages by-passed.

ABSOLUTE VALUE COMPARATOR

As described hereinbefore, peak absolute magnitude and average power may be determined using a comparison of the absolute magnitude of the signal. A preferred embodiment of a circuit performing the absolute value comparison is shown in FIG. 12, and wave shape and timing diagrams for the circuit are shown in FIGS. 13A–D. Referring to FIG. 12, the signal to be measured (from C-notch stage 112 of FIG. 5) is fed through resistor $R_{10}$ and capacitor $C_1$ to the input of operational amplifier 250 which has unity gain and inverts the signal. The inverted signal is fed to operational amplifier 250 which inverts it again. Thus, the sine wave input signal is inverted twice by operational amplifiers 250, 252. Each inversion is 180° out of phase and is fed to the positive (+) inputs of respective comparators 254, 256. Positive analog reference voltages are fed to the negative (−) input of the caparators by digital-to analog converter 116 which receives digital signals as its input from bi-directional control register 116. Tester computer 68 determines what particular reference level is to be supplied to the comparators. The output of comparators 254, 256 are connected through respective resistors R8 an R9 to the inputs of OR gate 258. The result of each absolute magnitude comparison is provided at the output of OR gate 258 which is fed to bi-directional control register 69, which in turn supplies this information to tester computer 68. For each of the comparators, when the signal or positive (+) input exceeds the reference or negative (−) input, a logic one output is obtained at the output of the respective comparator; and when the reference exceeds the signal, a logic 0 is obtained at the respective output. Thus, a logic 1 is obtained at the output or OR gate 258 when either half-cycle of the signal exceeds the reference and a logic 0 is obtained if neither half-cycle of the signal exceeds the reference. Thus, a logic 1 is obtained at the output of OR gate 258 if the absolute value of the signal exceeds the reference and a logic 0 is obtained if it does not.

Table 2 below is a truth table for comparators 254 and 256 and OR gate 258.

TABLE 2

| Comparator 254 Inputs | Output | Comparator 256 Inputs | Output | OR Gate 258 |
|---|---|---|---|---|
| signal > reference | 1 | signal < reference | 0 | 1 |
| signal < reference | 0 | signal > reference | 1 | 1 |
| signal < reference | 0 | signal < reference | 0 | 0 |

The condition of the signal exceeding the reference in both comparators simultaneously will not occur since the signals fed to the comparator are 180° out of phase. Thus, they can not both exceed the reference at the same time.

Referring now to FIG. 13, only the postive halves of the inverted signals are shown for the respective comparators. When the reference is equal to zero (FIG. 13A), then the respective comparator output will be a logic 1 except for the indecision zero crossing points when the signal and reference equal zero. At these points, the respective comparator output will momentarily change logic levels. In FIG. 13B, the reference is shown to be at V1 and the signal exceeds the reference near the peaks of the rectified sine wave. Thus, at the respective comparator output, a pules of logic 1 is generated during the shaded areas of the rectified sine wave and the crossing of the signal and reference occurs at the leading and trailing edges of these pulses. In FIG. 13C, the signal never exceeds the reference and the respective comparator output is at logic 0. A signal which is not perfectly symmetrical and possesses unequal positive and negative peak magnitudes will be inverted by the operational amplifiers so that at each positive (+) input of the comparators, a different peak signal is obtained as shown in FIG. 13D. In such a case, a logic 1 pulse will be obtained at the output of the respective comparator 254 for the time that the signal exceeds the reference.

If a peak absolute magnitude measurement is being made as described hereinbefore, an initial reference magnitude is established above the peak value (FIG. 13C) and continually measured is discrete steps or by successive approximations to arrive at a peak magnitude determination. If an average measurement is being made of a sinusoidal signal, reference magnitudes may be generated and compared as shown in FIG. 12 and described in the text accompanying FIG. 12.

With respect to use of the absolute value comparator circuit shown in FIG. 12 in the tester shown in FIG. 5, the digital-to-analog converter 116 is connected to the comparators and the control register 69 is connected to the output of OR gate 258 as shown in FIG. 12. The input signal from C-notch stage 112 is fed to operational amplifiers 250, 252 through $C_1$. The signal from the comparator 114 to the limiter 150 is connected to point 260 in FIG. 12. Computers and bi-directional control registers are well known in the art and these devices treat the tester/switchers and its circuitry, the low speed modems, and the switches as peripheral equipment. Programs utilizing the computer to perform the measurements described hereinbefore can easily be constructed by those skilled in the art.

The advantages of the present invention, as well as certain changes and modifications of the disclosed embodiments thereof, will be readily apparent to those skilled in the art. It is the applicants' intention to cover by their claims all those changes and modifications which could be made to the embodiments of the invention herein chosen for the purposes of the disclosure without departing from the spirit and scope of the invention.

What is claimed is:

1. Testing apparatus for information transmission systems including a one system station and at least another system station located remotely from the system station for performing tests related to information transmission between one system station and the remote station, the one system station and the remote system station being connected by a transmission link, comprising:
   (a) receiving means disposed at the remote station for receiving from the one system station independently of the transmission link there between a plurality of different predetermined command signals each adapted to initiate the testing apparatus to conduct a different one of a plurality of predetermined tests related to the transmission of information over the transmission link;
   (b) control means disposed at the remote station for providing a plurality of different control signals in response to different predetermined command signals from the one system station;
   (c) a plurality of circuits disposed at the remote station for processing in response to said control signals other signals related to the information transmission between the one system station and the remote station, the processing being related to the performance of at least one predetermined test; and
   (d) test result signal means disposed at the remote station for deriving test result signals in response to processing of the other signals related to the information transmission by said plurality of circuits in the performance of a predetermined test.

2. The testing apparatus of claim 1, wherein said control means and test result means comprises computer means.

3. The testing apparatus of claim 2, wherein said computer means provides different output signals in response to different command signals, and wherein said testing apparatus further comprises means for converting the different output signals of said computer means into the plurality of different control signals.

4. The testing apparatus of claim 2, wherein said computer means comprises memory means for storing a program corresponding to the plurality of different control signals.

5. The testing apparatus of claim 1 and further comprising switching means disposed at the remote location for selectively connecting the transmission link to portions of said testing apparatus and to information transmission apparatus in the remote station.

6. The testing apparatus of claim 1, wherein said control means comprises completing means for connecting another transmission link between the one system station and the remote station, the other transmission link being independent of the transmission link and selectively actuated from the one system station.

7. The testing apparatus of claim 6, wherein the one system station is the central station of an information transmission system.

8. The testing apparatus of claim 6, wherein said completing means comprises means responsive to a control signal of the plurality of control signals for sults provided from said comparison means, and means for summing weighted, reference magnitude levels whereby the average magnitude is approximated.

29. The testing apparatus of claim 28, wherein said apparatus is operative to measure average power, and wherein said computer means further comprises means for squaring said reference magnitude levels, said means for weighting each reference magnitude level being operative to weight squared reference magnitude levels, and said means for summing weighted, squared reference magnitude levels, whereby average power is approximated.

30. The testing apparatus of claim 28, wherein said plurality of instances is greater than 10.

31. The testing apparatus of claim 28, wherein said means for sequentially generating said reference magnitudes includes digital-to-analog converter means connected to said computer means and said comparison means, and said computer means feeds coded notations to said converter means in cooperation with said memory means, and said converter means provides analog output levels to said comparison means.

32. The testing apparatus of claim 31, wherein said reference magnitude pairs are sequentially generated.

33. The testing apparatus of claim 31, wherein said computer means in cooperation with said memory means provides binary coded notations to said converter means which sequentially, successively decrease in magnitude by equal magnitudes, successive pairs of binary coded notations corresponding to said pairs of reference magnitudes and successive analog output levels constituting said pairs of reference magnitudes, and wherein said comparison means in cooperation with said computer means is operative to compare each reference magnitude of each of said pairs individually with said signal, said computer means in cooperation with said memory means weighting each reference magnitude and further comprising means to take the difference between successive weighted reference magnitudes.

34. The testing apparatus of claim 28, wherein said signal is noise.

35. The testing apparatus of claim 34, wherein said plurality of circuits includes means for C-message weighting the noise whereby C-message noise is measured.

36. The testing apparatus of claim 28, wherein said plurality of circuits includes means for C-message weighting said signal and noise and C-notch means for notching out said signal whereby C-notch noise is measured.

37. The testing apparatus of claim 28, wherein said plurality of circuits includes means for automatically adjusting the signal level of signals received by said apparatus on the transmission link to place the signal level within predetermined ranges, said predetermined ranges being stored in said memory means.

38. A method for measuring phase jitter of a signal to be tested comprising generating a first phase stable signal at a multiple of the frequency of the signal to be tested and a second phase stable signal at the same frequency as the signal to be tested such that selected zero crossings of the second signal and the signal to be tested are in phase, successively counting the number of cycles of the first signal generated between the selected in-phase zero crossings and the next zero crossing of the signal to be tested, and taking the difference of successive counts of the number of cycles of first stable signal, whereby the difference of successive counts of the number of cycles of the first stable signal is a measure of phase jitter.

39. The method of claim 28, wherein said signal to be tested is a sinusoidal signal and further comprising converting the signal to be tested to a square wave signal.

40. The method of claim 39, wherein said multiple is at least 100.

41. Apparatus for measuring the phase jitter of a signal comprising:
(a) signal means for receiving said signal and generating a first phase stable signal at a multiple of the frequency of said signal and a second phase stable signal at the same frequency as said signal such that selected zero crossings of said signal and said second signal are in phase;
(b) counting means for counting the number of cycles of said first signal generated between said selected zero crossings and the next zero crossing of said signal; and
(c) means for taking the difference between successive counts whereby said difference is a measure of the phase jitter.

42. The apparatus of claim 41, wherein said signal is sinusoidal and said signal means is operative to generate first and second square waves constituting said first and second signals, respectively, said signal means further comprising square wave means for converting said sinusoidal signal to a square wave signal.

43. The apparatus of claim 42, wherein said signal means comprises a phase-locked loop.

44. The apparatus of claim 43, wherein said phase-locked loop comprises a counter operative to count between zero and said multiple and further operative to provide said second square wave.

45. A method for measuring the peak magnitude of a signal, comprising:
(a) sequentially generating a plurality of reference magnitudes, a respective reference magnitude being generated for at least that part of said signal during which said signal is at its peak magnitude;
(b) comparing said signal magnitude and each sequentially generated reference magnitude to obtain respective coded levels corresponding to each comparison;
(c) varying a next respective reference magnitude; and
(d) forming a coded notation from the coded levels which approximates the peak signal magnitude.

46. The method of claim 45, wherein said reference magnitudes are successively decreased by equal magnitudes.

47. The method of claim 45, wherein said reference magnitudes change in magnitude in accordance with the results of previous comparisons.

48. The method of claim 45, wherein said coded levels and coded notation are binary.

49. The method of claim 45, and further comprising generating at predetermined times threshold reference magnitudes above and below the approximated peak signal magnitude by predetermined magnitudes, said predetermined times corresponding to the expected peak magnitudes of the signals, and comparing said signal with said threshold magnitudes and providing coded levels in response thereto whereby said coded levels indicate amplitude hits and drop-outs.

selectively coupling the test result signals to the other transmission link when the other transmission link is actuated.

9. The testing apparatus of claim 6, wherein said testing apparatus is at least command controlled over the other transmission link.

10. The testing apparatus of claim 6, wherein said control means further comprises actuating means for selectively actuating the other transmission link.

11. The testing apparatus of claim 10, wherein, said actuating means is operable to selectively actuate the other transmission link to the one system station from the remote station.

12. The testing apparatus of claim 10, wherein said actuating means is operable to selectively actuate the other transmission link to the remote station.

13. The testing apparatus of claim 10, wherein said actuating means is operable to selectively actuate the other transmission link to another remote station.

14. The testing apparatus of claim 10, wherein said actuating means is operable to selectively actuate a third transmission link.

15. The testing apparatus of claim 14, wherein said actuating means is operative to actuate the third transmission link to another remote station.

16. The testing apparatus of claim 15, wherein said actuating means is operative to actuate the third transmission link to the other remote station while the completing means completes the other transmission link.

17. The testing apparatus of claim 4, wherein said memory means is programmable and is operative to be programmed over the other transmission link.

18. The testing apparatus of claim 1, wherein said testing apparatus is operative to measure phase jitter of signals related to the information transmission and wherein said plurality of circuits includes:
means for generating a first phase stable signal at a multiple of the frequency of a signal transmitted on the transmission link and a second phase stable signal at the same frequency as said signal such that selected zero crossings of said signal and said second signal are in-phase, and means for counting the number of cycles of said first phase stable signal occurring between said selected in-phase zero crossings and the next zero crossing of said signal, and wherein said test result signal means comprises means for taking the difference between successive countings, said difference being a measure of phase jitter.

19. The testing apparatus of claim 18, wherein said signal is a sinusoidal signal and said first and second signals are square waves, and wherein said plurality of circuits comprises square wave means for converting said sinusoidal signal to a square wave signal.

20. The testing apparatus of claim 18, wherein said multiple is at least 100.

21. The testing apparatus of claim 18, wherein said means for generating a first phase stable signal and a second phase stable signal comprises a phase-locked loop.

22. The testing apparatus of claim 21, wherein said means for generating a first phase stable signal and a second phase stable signal further comprises a counter operative to count between zero and said multiple and to provide said second phase stable signal from said first phase stable signal, and means for obtaining a counting from said counter after a selected next zero crossing of said signal.

23. The testing apparatus of claim 4, wherein said apparatus is operative to measure the peak magnitude of signals related to the information transmission, and wherein:
said plurality of circuits includes means for sequentially generating a plurality of reference magnitudes, each reference magnitude being generated for at least that part of a signal transmitted on the transmission link during which said signal is at its peak magnitude, and comparison means for comparing each of said reference magnitudes with said signal and in response thereto providing coded levels; and wherein
said computer means comprises means for receiving said coded levels and forming coded notations therefrom in cooperation with said memory means which approximates the peak signal magnitude.

24. The testing apparatus of claim 23, wherein said plurality of circuits includes digital-to-analog converter means connected to said computer means and said comparison means, and said computer means feeds coded notations to said converter means in cooperation with said memory means, and said converter means providing analog output levels to said comparison means.

25. The testing apparatus of claim 24, wherein said computer means in cooperation with said means provides coded notations to said converter means which successively decrease in magnitude by equal magnitudes.

26. The testing apparatus of claim 24, wherein said computer means in cooperation with said memory means provides coded notations to said converter means which change in magnitude in accordance with results of previous comparisons.

27. The testing apparatus of claim 23, wherein said apparatus is operative to measure amplitude hits and drop-outs of the signals related to the information transmission, wherein said plurality of circuits further includes means for generating at predetermined times in cooperation with said computer means and memory means threshold reference magnitudes above and below a previously approximated peak signal magnitude by predetermined values, said predetermined times corresponding to the expected peak magnitudes of a signal transmitted on the transmission link, said comparison means comparing said threshold reference magnitudes with said signal and providing coded levels in response thereto, whereby said coded levels indicate amplitude hits and drop-outs.

28. The testing apparatus of claim 4, wherein said apparatus is operative to measure the average magnitude of signals related to the information transmission, and wherein:
said plurality of circuits includes means for sequentially generating a plurallity of pairs of reference magnitudes, each reference magnitude being generated for a specified time period corresponding to an average measurement of a signal transmitted on the transmission link and each pair defining a reference magnitude level, and comparison means for comparing at least each pair of said reference magnitudes at a plurality of instances with said signal during the specified time period and in response thereto providing coded levels; and wherein
said computer means comprises means for receiving said coded levels and in cooperation with said memory means weighting each reference magnitude level in accordance with the comparison re- 50. Apparatus for measuring the peak magnitude of a signal comprising:
  (a) signal means for receiving said signal and comprising means for sequentially generating a plurality of reference magnitudes, each reference magnitude being generated for at least that part of said signal during which said signal is at its peak magnitude and each successive reference magnitude being varied;
  (b) comparison means for comparing each of said reference magnitudes with said signal and in response thereto providing coded levels; and
  (c) means for receiving said coded levels and forming a coded notation therefrom which approximates the peak signal magnitude.

51. The apparatus of claim 50, wherein said signal means comprises digital-to-analog converter means and computer and memory means, said converter means being connected to said computer means and said comparison means whereby coded notations are fed to said converter means from said computer means in cooperation with said memory means and said converter means provides analog output levels to said comparison means.

52. The apparatus of claim 51, wherein said computer means in cooperation with said memory means provides binary coded numbers to said converter means which successively decrease in magnitude by equal magnitudes.

53. The apparatus of claim 51, wherein said computer means in cooperation with said memory means provides binary coded numbers to said converter means which change in magnitude in accordance with results of previous comparisons.

54. The apparatus of claim 50, wherein said apparatus is operative to measure amplitude hits and drop-outs and wherein said signal means is further operative to generate at predetermined times threshold reference magnitudes above and below a previously approximated peak signal magnitude by predetermined values, said predetermined times corresponding to the expected peak magnitude, said comparison means comparing said threshold reference magnitudes with said signal and providing coded levels in response thereto whereby said coded levels indicate amplitude hits and drop-outs.

55. A method for measuring the average magnitude of a signal comprising
  (a) generating a plurality of pairs of reference magnitudes, each reference magnitude being maintained for a specified time period corresponding to an average measurement and each pair defining a reference magnitude level;
  (b) comparing the signal magnitude with at least each pair of reference magnitudes at a plurality of instances during the specified time period to determine weighted contributions of each reference magnitude level to the average value; and
  (c) summing each weighted contribution.

56. The method of claim 55, and further comprising the step of squaring each reference magnitude level and wherein weighted contributions of each squared reference magnitude level are determined and the squared, weighted contributions are summed, whereby average signal power is approximated.

57. The method of claim 55, wherein said plurality of instances is greater than 10.

58. The method of claim 55, wherein said reference magnitude pairs are sequentially generated.

59. The method of claim 58, wherein said reference magnitude is sequentially generated and the sequentially generated reference magnitudes successively decrease by equal values, each reference magnitude being compared with said signal and a coded level provided in response thereto, said coded levels indicating the weighted contribution for each reference magnitude and the difference in successive weighted contributions being the weighted contribution of each level.

60. The method of claim 55, wherein said signal is noise and whereby average noise is measured.

61. The method of claim 55, wherein the noise is weighted by C-message means, whereby C-message noise is measured.

62. The method of claim 55, wherein the signal is notched out by C-notch means and weighted by C-message means, whereby C-notch noise is measured.

63. Apparatus for measuring the average magnitude of a signal comprising:
  (a) signal means for receiving said signal and comprising means for sequentially generating a plurality of pairs of reference magnitudes, each reference magnitude being generated for a specified time period corresponding to an average measurement and each pair defining a reference magnitude level;
  (b) comparison means for comparing at least each pair of said reference magnitudes at a plurality of instances during the specified time period and in response thereto providing coded levels;
  (c) means for receiving said coded levels and weighting each reference magnitude level in accordance with the results provided from said comparison means, and
  (d) means for summing weighted reference magnitude levels whereby the average magnitude is approximated.

64. The apparatus of claim 63, and further comprising means for squaring said reference magnitude levels, said means for weighting each reference magnitude level being operative to weight squared, reference magnitude levels, and said means for summing weighted, reference magnitude levels being operative to sum weighted squared, reference magnitude levels, whereby average power is approximated.

65. The apparatus of claim 63, wherein said plurality of instances is greater than 10.

66. The apparatus of claim 63, wherein said signal means comprises digital-to-analog converter means and computer and memory means, said converter means being connected to said computer means and said comparison means whereby coded notations are fed to said converter means from said computer means in cooperation with said memory means and said converter means provides analog output levels to said comparison means.

67. The apparatus of claim 66, wherein said computer means in cooperation with said memory means provides coded notations to said converter means which sequentially, successively decrease in magnitude by equal magnitudes, successive pairs of coded notations corresponding to said pairs of reference magnitudes, successive analog output levels comprising said pairs of reference magnitudes, and wherein said comparison means is operative to compare each reference magnitude of each of said pairs individually with said signal and provide coded levels, said memory and computer means being operative to weight each coded level, and further comprising means to take the different between successive weighted coded levels.

68. The apparatus of claim 63, wherein said signal is noise.

69. The apparatus of claim 68, wherein said signal means comprises means for C-message weighting the noise whereby C-message noise is measured.

70. The apparatus of claim 63, wherein said signal means comprises means for C-message weighting said signal and noise and C-notch means for notching out said signal whereby C-notch noise is measured.

71. A testing system for information transmission systems having a plurality of stations including a central station, at least one station located remotely from the central station and connected thereto by a transmission link, and at least another remote station connected to the one remote station by an additional transmission link, said testing system performing tests related to information transmission between the one remote station and the other remote station and comprising testing apparatus located at least at the one remote station, said testing apparatus comprising:
  (a) receiving means for receiving from the central station independently of a transmission link a plurality of a different predetermined command signals each adapted to initiate a different one of a plurality of predetermined tests related to the transmission of information over a transmission link;
  (b) control means for providing a plurality of different control signals in response to different predetermined command signals;
  (c) a plurality of circuits for processing in response to said control signals other signals related to the information transmission between the other remote station and the one remote station, the processing being related to at least one predetermined test; and
  (d) test result signal means for deriving test result signals in response to processing of the other signals related to the information transmission by said plurality of circuits in the performance of a predetermined test.

72. The testing system of claim 71, wherein said testing system further comprises said testing apparatus located in the other remote station.

73. The testing system of claim 71, wherein said control means and test result means comprises computer means, said computer means providing different output signals in response to different command signals, and wherein said testing apparatus further comprises means for converting the different output signals of said computer means into the plurality of different control signals, and said computer means including memory means for storing a program corresponding to the plurality of different control signals.

74. The testing system of claim 71, wherein the testing apparatus further comprises means for selectively switching the information transmission link and the additional information transmission link and means for selectively connecting the transmission link to said testing apparatus.

75. The testing system of claim 73, wherein said control means comprises completing means to complete a third transmission link selectively actuated from a station other than that in which the control means is located.

76. The testing system of claim 73, wherein said control means further comprises actuating means for selectively actuating a third transmission link.

77. The testing system of claim 75, wherein said testing system further comprises said testing apparatus located in the other remote station and wherein said control means at least in the one remote station further comprises actuating means for selectively actuating a fourth transmission link.

78. The testing system of claim 77, wherein said actuating means is operable to selectively actuate the fourth transmission link from the one remote station to the completing means in the other remote station.

* * * * *

UNITED STATES PATENT AND TRADEMARK OFFICE
CERTIFICATE OF CORRECTION

PATENT NO. : 4,112,264

DATED : September 5, 1978

INVENTOR(S) : Carl N. Abramson et al.

It is certified that error appears in the above-identified patent and that said Letters Patent are hereby corrected as shown below:

Column 3, line 6, after "merely" insert --to--
Column 3, line 67, delete "staions" and insert --stations--
Column 5, line 59, delete "geatest" and insert --greatest--
Column 6, line 14, delete "magntidues" to --magnitudes--
Column 6, line 33, delete "determind" and insert --determined--
Column 7, line 25, delete "$\frac{(S_n + S_{n-1})^2}{2}$" and insert -- $\frac{(S_n + S_{n-1})^2}{2}$ --

Column 10, lines 16-17, delete "respectvely" and insert --respectively--
Column 11, line 43, after 57 delete "," and insert --.--
Column 11, line 58, delete "partiularly" and insert --particularly--
Column 13, line 38, after "15" insert --,--
Column 15, line 50, delete "phased-lock" and insert --phase-locked--
Column 18, line 18, delete "accuarcy" and insert --accuracy--
Column 18, line 31, delete "stobed" and insert --strobed--
Column 18, line 51, delete "occurance" and insert --occurrence--
Column 18, line 62, delete "Synchronzation" and insert --Synchronization--
Column 18, lines 64-65, delete "occurence" and insert --occurrence--
Column 20, line 28, delete "comparitor" and insert --comparator--
Column 20, line 46, delete "considertion" and insert --consideration--
Column 20, line 65, delete "asynchronously" and insert --asynchronously--

UNITED STATES PATENT AND TRADEMARK OFFICE
CERTIFICATE OF CORRECTION

PATENT NO. : 4,112,264

DATED : September 5, 1978

INVENTOR(S) : Carl N. Abramson et al.

It is certified that error appears in the above-identified patent and that said Letters Patent are hereby corrected as shown below:

Column 21, line 5, after "by" delete first --those--

Column 21, lines 38-40 delete "$\frac{1}{A} \int_{t}^{t+A} s\, dt$" and insert -- $\frac{1}{A} \int_{t}^{t+A} s\, dt$ --

Column 21, lines 51-55 delete "$P_{av} = K \sum_{n=1}^{N}$" and insert -- $P_{av} = K \sum_{n=1}^{N}$ --

Column 21, line 56 delete "proprotionally" and insert --proportionally--

Column 22, line 19 delete "recieved" and insert --received--

Column 23, line 14, delete "aperodically" and insert --aperiodically--

Column 23, line 50 delete "$|P^-n - P_{n-1}|$" and insert -- $|P_n - P_{n-1}|$ --

Column 23, line 60 delete "$t_7\ 14\ t_{10}$" and insert -- $t_7 - t_{10}$ --

Column 24, lines 1 and 3, delete "ration" and insert --ratio--

UNITED STATES PATENT AND TRADEMARK OFFICE
CERTIFICATE OF CORRECTION

PATENT NO. : 4,112,264
DATED : September 5, 1978
INVENTOR(S) : Carl N. Abramson et al.

It is certified that error appears in the above-identified patent and that said Letters Patent are hereby corrected as shown below:

Column 26, line 9, delete "inpulse" and insert --impulse--
Column 26, line 47, delete "caparators" and insert --comparators--
Column 26, line 53, delete "an" and insert --and--
Column 27, line 17, delete "postive" and insert --positive--
Column 27, line 27, delete "pules" and insert --pulse--
Column 27, line 44, delete "is" and insert --in--
Column 30, line 26, after "said" insert --memory--

Signed and Sealed this

Seventeenth Day of July 1979

[SEAL]

Attest:

Attesting Officer

LUTRELLE F. PARKER
Acting Commissioner of Patents and Trademarks